US012657729B2

(12) United States Patent　　　(10) Patent No.:　US 12,657,729 B2
Chakraborty et al.　　　　　　　(45) Date of Patent:　Jun. 16, 2026

(54) VECTORIZING DIGITAL IMAGES VIA IMAGE SEGMENTATION WITH GRADIENTS

(71) Applicant: Adobe Inc., San Jose, CA (US)

(72) Inventors: Souymodip Chakraborty, Bangalore (IN); Ankit Phogat, Noida (IN); Jaswant Singh Ranawat, Chittorgarh (IN); Vineet Batra, Pitam Pura (IN)

(73) Assignee: Adobe Inc., San Jose, CA (US)

( * ) Notice: Subject to any disclaimer, the term of this patent is extended or adjusted under 35 U.S.C. 154(b) by 141 days.

(21) Appl. No.: 18/812,428

(22) Filed: Aug. 22, 2024

(65) Prior Publication Data

US 2026/0057524 A1　Feb. 26, 2026

(51) Int. Cl.
| | |
|---|---|
| *G06T 7/11* | (2017.01) |
| *G06T 7/12* | (2017.01) |
| *G06T 7/136* | (2017.01) |
| *G06T 7/162* | (2017.01) |
| *G06T 11/40* | (2006.01) |

(52) U.S. Cl.
CPC ................. *G06T 7/11* (2017.01); *G06T 7/12* (2017.01); *G06T 7/136* (2017.01); *G06T 7/162* (2017.01); *G06T 11/40* (2013.01); *G06T 2207/20072* (2013.01)

(58) Field of Classification Search
None
See application file for complete search history.

(56) References Cited

PUBLICATIONS

Ng. et al., Medical Image Segmentation Using K-Means Clustering and Improved Watershed Algorithm, Mar. 28, 2006, IEEE, 61-65, (Year: 2006).*
Alexandrina Orzan, Adrien Bousseau, Pascal Barla, Holger Winnemöller, Joëlle Thollot, and David Salesin. "Diffusion Curves: A Vector Representation for Smooth-Shaded Images", Communications of the ACM, 56(7):101-108, Jul. 2013.
Bhaskar Dhariyal, Thach Le Nguyen, Severin Gsponer, and Georgiana Ifrim. "An Examination of the State-of-the-Art for Multivariate Time Series Classification", International Conference on Data Mining Workshops (ICDMW) pp. 243-250, 2020.
(Continued)

*Primary Examiner* — Robert J Craddock
(74) *Attorney, Agent, or Firm* — Keller Preece PLLC

(57)　　　　ABSTRACT

The present disclosure relates to systems, methods, and non-transitory computer-readable media that generates a vectorized digital image of a raster image according to at least one gradient fill function. In particular, the disclosed systems generate a segmentation map of a raster digital image by using a segmentation model to cluster pixel values while minimizing a number of boundaries. Moreover, the disclosed systems generate one or more closed connected partitions that include locally smooth pixel values within the raster digital image according to the boundaries of the segmentation map. Further, the disclosed systems fit one or more fill function to the closed connected partition(s), where the one or more fill function includes at least one gradient fill function for a closed connected partition. The disclosed systems generate the vectorized digital image according to the at least one gradient fill function for the closed connected partition.

20 Claims, 12 Drawing Sheets

(56)　　　　　References Cited

PUBLICATIONS

Gregory Lecot and Bruno Levy. "Ardeco: Automatic Region DETection and COnversion", In Proceedings of the 17th Eurographics Conference on Rendering Techniques, EGSR '06, p. 349-360, Goslar, DEU, Eurographics Association, 2006.

Jean-Dominique Favreau, Florent Lafarge, and Adrien Bousseau. "Photo2ClipArt: Image Abstraction and Vectorization Using Layered Linear Gradients", ACM Transactions on Graphics, 36(6), Nov. 2017.

Jian Sun, Lin Liang, FangWen, and Heung-Yeung Shum. "Image Vectorization using Optimized Gradient Meshes", ACM Transactions on Graphics, 26(3):11-1-11-7, Jul. 2007.

Ruchin Kansal and Subodh Kumar. "A vectorization framework for constant and linear gradient filled regions", Vis. Comput., 31(5):717-732, May 2015.

Nicholas van der Walle, "How to get the gradient from your art in Illustrator", Astute Graphics, England, 3 pages [online], Retrieved from the Internet on Oct. 16, 2025: <URL: https://astutegraphics.com/learn/10minskills/how-to-get-the-gradient-from-your-art-in-illustrator>.

* cited by examiner

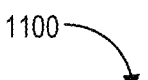

1100

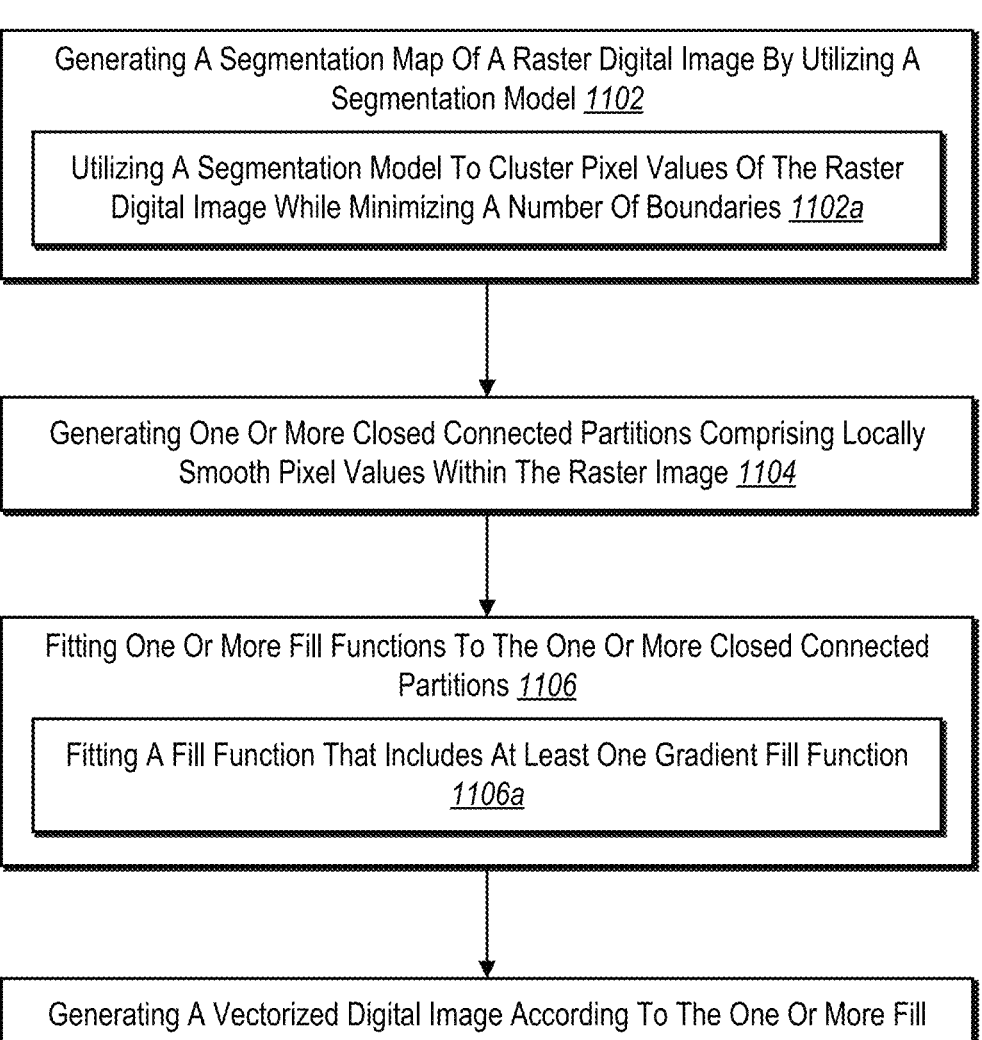

Generating A Segmentation Map Of A Raster Digital Image By Utilizing A Segmentation Model *1102*

Utilizing A Segmentation Model To Cluster Pixel Values Of The Raster Digital Image While Minimizing A Number Of Boundaries *1102a*

Generating One Or More Closed Connected Partitions Comprising Locally Smooth Pixel Values Within The Raster Image *1104*

Fitting One Or More Fill Functions To The One Or More Closed Connected Partitions *1106*

Fitting A Fill Function That Includes At Least One Gradient Fill Function *1106a*

Generating A Vectorized Digital Image According To The One Or More Fill Functions *1108*

*Fig. 11*

VECTORIZING DIGITAL IMAGES VIA IMAGE SEGMENTATION WITH GRADIENTS

BACKGROUND

Recent years have seen significant advancement in hardware and software platforms for converting a raster image into a vector graphic format. For example, many software platforms provide vectorization tools that translate a pixel-based image into a vector graphic. Specifically, vectorizing a pixel-based image allows for scaling a digital image without quality loss, editing and manipulation, and crafting vector-based artwork for print or digital use. Given the varied content of raster images, converting raster images to vector format while maintaining accurate object boundaries, edge information, and color composition via image segmentation algorithms is often a difficult task. Despite advancements in raster image processing, existing vectorization systems continue to suffer from a variety of problems with regard to computational accuracy, computational efficiency, and operational flexibility of implementing computing devices.

SUMMARY

One or more embodiments described herein provide benefits and/or solve one or more of the problems in the art with systems, methods, and non-transitory computer-readable media that uses a segmentation model to capture gradient fill functions in addition to constant fills functions for generating a vectorized digital image from a raster image. For example, the disclosed systems generate a segmentation map of a raster digital image by using the segmentation model to cluster pixel values of the raster digital image according to pixel value transitions while also minimizing a number of boundaries within the raster digital image. In some embodiments, the disclosed systems generate closed connected partitions (e.g., regions of the raster digital image) according to the minimized number of boundaries. Further, in some embodiments, the disclosed systems fit one or more fill functions that includes at least one gradient fill function for a closed connected partition and generates a vectorized digital image according to the at least one gradient fill function. In additional embodiments, the disclosed systems also use discontinuity aware image segmentation to partition smooth pixel value regions while treating pixels across boundary gaps as separate regions.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 11 illustrates a flowchart of a series of acts for generating a vectorized digital image according to a gradient fill function in accordance with one or more implementations;

DETAILED DESCRIPTION

Figure 1:
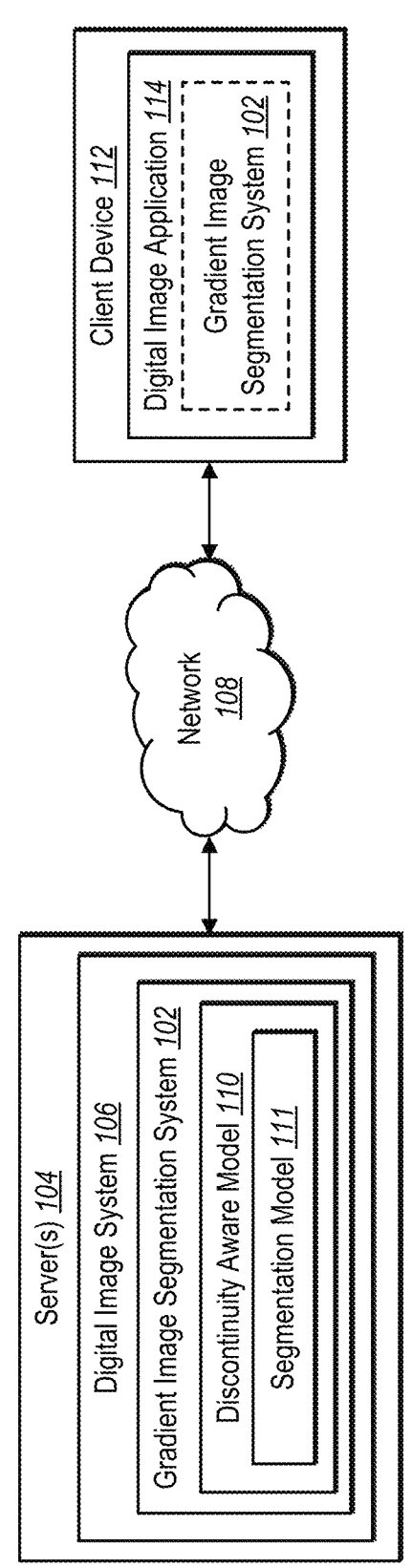
FIG. 1 illustrates an example environment in which a gradient image segmentation system operates in accordance with one or more implementations.

One or more embodiments described herein include a vectorization pipeline for vectorizing a raster digital image with the use of a segmentation model and one or more gradient. In some instances, a gradient image segmentation system generates a segmentation map that minimizes boundaries while providing accurate color conversion by using gradient fills in place of constant fills. Specifically, the gradient image segmentation system determines portions of a raster digital image to represent as gradient fills and/or constant fills (e.g., solid fills). For example, the gradient image segmentation system performs pre-processing on a raster digital image to generate a segmentation map with locally smooth pixel values and a minimal number of boundaries. Furthermore, the gradient image segmentation system generates closed connected partitions according to the boundaries of the segmentation map (e.g., using edge detection) and fits a fill function (e.g., gradient, constant, or piece-wise constant) to each closed connected partition.

In one or more embodiments, the gradient image segmentation system uses a segmentation model to minimize the number of boundaries while maintaining accurate color value representation by balancing various constraints. Specifically, the gradient image segmentation system balances a first constraint on a reconstruction loss relative to the raster digital image, a second constraint on local constancy in pixel values that indicate a local level of smoothness, and a third constraint on numbers of pixels at edges of boundaries. For example, the gradient image segmentation system uses a Mumford-Shaw functional for preprocessing (e.g., smoothing and edge detection) and creating partitions of the segmentation map with smooth color value transitions.

In one or more embodiments, the gradient image segmentation system determines portions of a raster digital image to represent as gradient fills. Specifically, based on a segmentation map, the gradient image segmentation system determines a direction of a gradient fill function within a closed connected partition by finding a direction that best aligns with pixel values within the closed connected partition. Furthermore, in some embodiments, the gradient image segmentation system determines one or more stops of the gradient fill function to indicate one or more color transitions of the gradient.

As also alluded to above, in some embodiments, the gradient image segmentation system flexibly selects from various fill functions to create a vectorized digital image. Specifically, the gradient image segmentation system selects from a gradient fill function, a constant fill function, and a piecewise constant fill function to fit to a closed connected partition. In other words, the gradient image segmentation system identifies closed connected partitions where gradient fill functions are the most appropriate and selects constant fill functions and/or piecewise constant fill functions for the remaining closed connected partitions.

Moreover, in some embodiments, the gradient image segmentation system updates the generated one or more closed connected partitions based on boundary gaps in the segmentation map. Specifically, the gradient image segmentation system performs discontinuity aware segmentation of a raster digital image. For instance, the gradient image segmentation system maintains a balance between image fidelity and simplified geometry by employing a more sophisticated segmentation model (e.g., the segmentation model expressly honors discontinuities in segmented regions).

As just mentioned, the gradient image segmentation system performs discontinuity aware segmentation. For example, the gradient image segmentation system treats the discontinuity issue as a graph-cut problem and generates nodes representing a plurality of closed connected partitions. Further, the gradient image segmentation system determines an order of the plurality of nodes (e.g., using a heuristic algorithm) and generates edges between each of the nodes. For instance, the gradient image segmentation system generates an edge between two nodes based on a determination that the pair of nodes are within a same boundary. Additionally, the gradient image segmentation system determines that one or more nodes are not within the same boundary and utilizes a graph-cut model to generate a separate graph for one or more nodes not within the same boundary. In some embodiments, based on the generated graphs, the gradient image segmentation system updates the one or more closed connected partitions (e.g., and fits an updated fill function to the updated one or more closed connected partitions).

As mentioned above, conventional vectorization systems suffer from a variety of problems with regard to computational accuracy, computational efficiency and operational flexibility. For example, conventional vectorization systems suffer from computational accuracy in the context of vectorizing a pixel-based image. Specifically, conventional vectorization systems generate segmented images by dividing a pixel-based image into multiple segments that are each filled with constant fills. In doing so, conventional systems generate vectorized images with poor visual appearances and solid bands (e.g., banding, instead of smooth shading).

Furthermore, conventional vectorization systems typically generate vectorized images that are difficult to use in any subsequent workflows (e.g., especially for vectorized images that rely on a large number of constant fill functions). In other words, conventional vectorization systems use segmentation methods that result in poor quality vectorized digital images and often encounter issues when users try to incorporate vectorized digital images in additional downstream workflows (e.g., editing constructed vector images).

Moreover, in some embodiments, conventional vectorization systems suffer from computational inefficiency for vectorizing a pixel-based image. Specifically, conventional vectorization systems typically generate a vectorized version of a digital image with a large number of solid bands. For example, the segmented images with a large number of solid bands created by conventional systems (e.g., as part of the vectorization pipeline) further contributes to large file sizes that are inefficient and costly to store and process.

Additionally, in some embodiments, conventional vectorization systems typically rely on multiple inputs from users to create a vectorized version of a digital image. As such, conventional vectorization systems typically have a steep learning curve to use various vectorization features. Additionally, reliance on user input to generate vectorized digital images further exacerbates computational accuracy issues described above.

Relatedly, conventional vectorization systems also suffer from operational flexibility. As mentioned, conventional vectorization systems often create vectorized digital images with a poor visual appearance and are difficult to edit in downstream applications. Specifically, conventional vectorization systems are limited to rigid segmentation methods that create larger file sizes and lower quality vector images (e.g., that are difficult to edit/manipulate).

In one or more embodiments, the gradient image segmentation system provides several improvements over conventional vectorization systems in relation to accuracy, efficiency, and operational flexibility. For example, in some embodiments, the gradient image segmentation system improves upon computational accuracy. As mentioned above, conventional vectorization systems generate vectorized images with poor visual appearances and solid bands (e.g., banding). In contrast, in some embodiments, the gradient image segmentation system vectorizes raster digital images with improved color representation by using a segmentation model to cluster pixel values for smooth color transitions while minimizing a number of boundaries. In some embodiments, from the boundaries of a generated segmentation map, the gradient image segmentation system generates closed connected partitions and fits fill functions to the closed connected partitions that includes a gradient fill function. In doing so, the gradient image segmentation system generates vectorized digital images at a higher quality (e.g., relative to conventional vectorization systems) with a gradual transition between colors to avoid banding issues.

Moreover, in some embodiments, the gradient image segmentation system generates the vectorized digital image according to at least one gradient fill function which results in enhanced accuracy for downstream workflows. Specifically, the gradient image segmentation system creates vectorized digital images from segmentation maps with locally smooth pixel values and a minimal number of boundaries which is easier for editing in downstream workflows. In other words, the gradient image segmentation system uses a minimal number of segments (e.g., avoids generating segmentation maps with an excessive number of segments) by accurately vectorizing gradients detected in a raster digital image to enhance the quality of the vectorized digital image and improve the accuracy of subsequent manipulations.

In one or more embodiments, the gradient image segmentation system improves computational efficiency of computing systems that vectorize raster digital images. As mentioned above, conventional vectorization systems often create large file sizes to store the vectorized digital images by representing all color values with solid bands, sometimes resulting in large numbers of boundaries. In contrast, the gradient image segmentation system generates a vectorized digital image using gradient fill functions when appropriate, which reduces the file size (e.g., relative to conventional systems) and provides more efficient storage of vectorized digital images.

Moreover, in some embodiments, the gradient image segmentation system seamlessly performs vectorization of pixel-based images with varied image content. Specifically, by utilizing an improved segmentation model with dynamic gradient detection, the gradient image segmentation system generates accurate vectorized image content while limiting client device interactions. As such, the gradient image segmentation system generates a simple and clean output with minimal required paths for a vectorized digital image. Additionally, in contrast to conventional vectorization systems (e.g., which are rigidly restricted to creating vectorized digital images with a large number of bands), the gradient image segmentation system selects from a gradient fill function, a constant fill function, or a piecewise constant fill function to represent color values in each segmentation region. In doing so, the gradient image segmentation system more flexibly generates vectorized digital images with a higher quality relative to conventional systems.

In addition to generating more accurate vectorized digital images, in one or more embodiments, the gradient image segmentation system also performs discontinuity aware segmentation. For instance, the gradient image segmentation system more accurately balances between image fidelity and simplified geometry to generate vectorized digital images that honors boundary discontinuities. In doing so, the gradient image segmentation system generates more accurate vector images relative to conventional vectorization systems. Specifically, the gradient image segmentation system more flexibly adapts to a wide variety of scenarios that include well-defined boundaries and/or boundary discontinuities. In other words, the gradient image segmentation system extends to use cases of images with boundaries that include discontinuities and accurately preserves these discontinuities to balance image fidelity and simplified geometry.

Additional details regarding the gradient image segmentation system will now be provided with reference to the figures. For example, FIG. 1 illustrates a schematic diagram of an exemplary system environment 100 in which a gradient image segmentation system 102 operates. As illustrated in FIG. 1, the system environment 100 includes server(s) 104, a digital image system 106, a network 108, and a client device 112. Additionally, FIG. 1 illustrates that the digital image system 106 includes the gradient image segmentation system 102 and the gradient image segmentation system 102 further includes a discontinuity aware model 110. Moreover, the client device 112 includes a digital image application 114.

Although the system environment 100 of FIG. 1 is depicted as having a particular number of components, the system environment 100 is capable of having a different number of additional or alternative components (e.g., a different number of servers, client devices, or other components in communication with the gradient image segmentation system 102 via the network 108). Similarly, although FIG. 1 illustrates a particular arrangement of the server(s) 104, the network 108, and the client device 112, various additional arrangements are possible.

The server(s) 104, the network 108, and the client device 112 are communicatively coupled with each other either directly or indirectly (e.g., through the network 108 discussed in greater detail below in relation to FIG. 12). Moreover, the server(s) 104 and the client device 112 include one or more of a variety of computing devices (including one or more computing devices as discussed in greater detail in relation to FIG. 12).

As mentioned above, the system environment 100 includes the server(s) 104. In one or more embodiments, the server(s) 104 process input for generating a vectorized version of a digital image (e.g., by employing one or more models such as a segmentation model 111 and/or the discontinuity aware model 110). In one or more embodiments, the server(s) 104 comprise a data server. In some implementations, the server(s) 104 comprise a communication server or a web-hosting server.

In some embodiments, the client device 112 includes computing devices associated with the one or more user accounts that submit requests to generate vector images from raster images by using the gradient image segmentation system 102. For instance, the gradient image segmentation system 102 trains a segmentation model using a training dataset (e.g., a training dataset containing multiple image pairs with closed connected partitions suitable for fitting various fill functions including gradient fill functions) provided from an additional client device. Additionally, the gradient image segmentation system 102 utilizes a segmentation model to generate a segmentation map with locally smooth pixel values and a minimal number of boundaries. Further, the gradient image segmentation system 102 generates a vectorized digital image according to one or more gradient fill functions fit to one or more closed connected partitions of the segmentation map.

In one or more embodiments, the client device 112 includes smartphones, tablets, desktop computers, laptop computers, head-mounted-display devices, or other electronic devices. The client device 112 includes one or more software applications (e.g., the digital image application 114) for generating or modifying digital images in accordance with the digital image system 106. In one or more embodiments, the digital image application 114 includes a software application hosted on the server(s) 104 accessible by the client device 112 through another application, such as a web browser.

To provide an example implementation, in some embodiments, the gradient image segmentation system 102 on the server(s) 104 supports the gradient image segmentation system 102 on the client device 112. For instance, in some cases, the digital image system 106 on the server(s) 104 gathers data for the gradient image segmentation system 102. In response, the gradient image segmentation system 102, via the server(s) 104, provides the information to the client device 112. In other words, the client device 112 obtains (e.g., downloads) the gradient image segmentation system 102 from the server(s) 104. Once downloaded, the gradient image segmentation system 102 on the client device 112 provides tools for performing the vectorization process (e.g., fits one or more gradient fill functions to one or more closed connected partitions of a segmentation map).

In alternative implementations, the gradient image segmentation system 102 includes a web hosting application that allows the client device 112 to interact with content and services hosted on the server(s) 104. To illustrate, in one or more implementations, the client device 112 access a software application supported by the server(s) 104. In response, the gradient image segmentation system 102 on the server(s) 104 provides tools for performing the vectorization process.

Indeed, in some embodiments, the gradient image segmentation system 102 is implemented in whole, or in part, by the individual elements of the system environment 100. For instance, although FIG. 1 illustrates the gradient image segmentation system 102 implemented or hosted on the server(s) 104, different components of the gradient image segmentation system 102 are able to be implemented by a variety of devices within the system environment 100. For example, one or more (or all) components of the gradient image segmentation system 102 are implemented by a different computing device or a separate server from the server(s) 104. Indeed, as shown in FIG. 1, the client device 112 includes the gradient image segmentation system 102. Example components of the gradient image segmentation system 102 will be described below with regard to FIG. 10.

Figure 2:
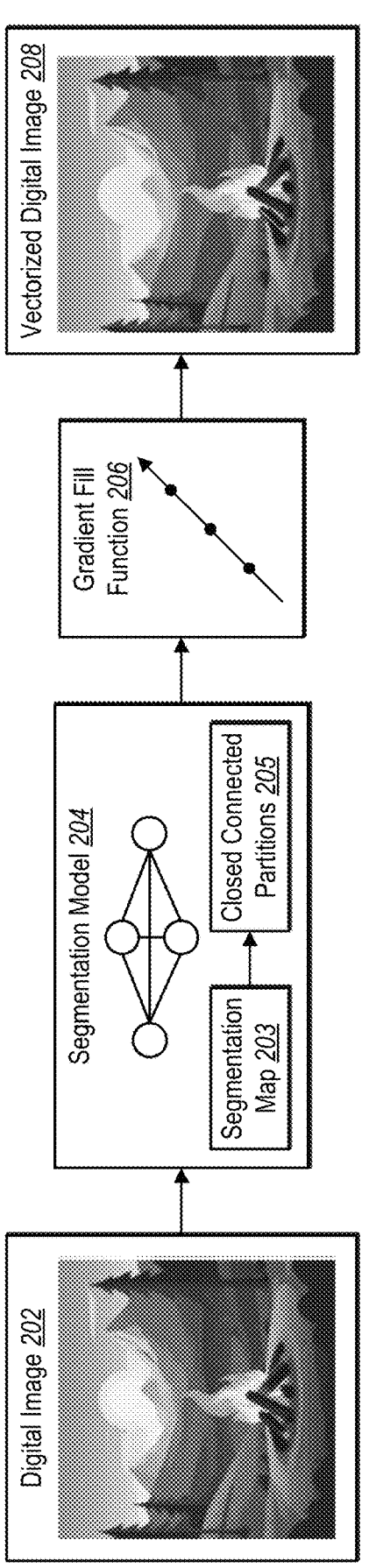
FIG. 2 illustrates an overview of the gradient image segmentation system fits one or more gradient fill functions to a digital image and generates a vectorized digital image from the gradient fill function(s) in accordance with one or more implementations.

As mentioned above, in certain embodiments, the gradient image segmentation system 102 fits one or more gradient fill functions to one or more closed connected partitions of a segmentation map to reduce the number of segments relative to conventional systems. FIG. 2 illustrates an example overview of the gradient image segmentation system 102 fitting a gradient fill function and generating a vectorized digital image based on the gradient fill function in accordance with one or more embodiments.

As shown in FIG. 2, the gradient image segmentation system 102 receives a digital image 202. In one or more embodiments, the digital image 202 includes various pictorial elements represented by a plurality of pixel values that define the spatial and visual aspects of the digital image 202 (e.g., such as text and image objects). For example, the digital image 202 is a rasterized digital image which includes a grid of pixels at a fixed resolution (e.g., as determined by a number of pixels within the digital image 202). Moreover, in some embodiments, the raster digital image contains multiple color regions separated by a plurality of boundaries (e.g., object boundaries).

As mentioned, the digital image 202 contains pixel values. In one or more embodiments, pixel values refer to a numerical representation of the color and intensity (e.g., brightness) of each individual pixel in a digital image. Specifically, for a color digital image, the disclosed system represents each pixel value by multiple values (e.g., RGB channels), where each channel value denotes the intensity of the respective color component. For instance, for multiple dimension pixel values, each channel value denotes the intensity of the respective color component. For example, the gradient image segmentation system 102 refers to the pixel values to cluster together regions of the digital image. For instance, the gradient image segmentation system 102 utilizes the pixel values to create closed connected partitions that include pixel value clusters with pixel values that are similar to each other (e.g., within a threshold similarity).

As shown in FIG. 2, the gradient image segmentation system 102 uses a segmentation model 204 to generate a segmentation map 203 and closed connected partitions 205 of the digital image 202. In one or more embodiments, the segmentation model 204 includes a model that the gradient image segmentation system 102 utilizes for image segmentation tasks. Specifically, the gradient image segmentation system 102 uses the segmentation model 204 to divide the digital image 202 into multiple segments or regions based on certain attributes. For example, the gradient image segmentation system 102 utilizes the segmentation model 204 to divide the digital image 202 based on pixel values and a number of boundaries within the digital image 202. In some embodiments, the gradient image segmentation system 102 uses the segmentation model 204 to minimize a number of boundaries in a segmentation map by balancing various constraints (e.g., via a Mumford-Shaw functional). Additional details of the gradient image segmentation system 102 balancing various constraints with the segmentation model are given below in the description of FIG. 3.

As just mentioned, the gradient image segmentation system 102 uses the segmentation model 204 to minimize a number of boundaries extracted from the digital image 202. In one or more embodiments, a boundary refers to a delineation between different regions or objects within the digital image 202. Specifically, the boundary includes an outline or border that separates one part of the digital image 202 from another part. For example, the gradient image segmentation system 102 utilizes a boundary to separate a region of the digital image 202 that has a threshold similarity of pixel values (e.g., locally smooth pixel values) from another region that does not satisfy a threshold similarity. Moreover, in some embodiments, the gradient image segmentation system 102 emphasizes minimizing a number of boundaries (e.g., during creation of a segmentation map from the raster digital image). As mentioned above, details of how the gradient image segmentation system 102 minimizes the number of boundaries (e.g., via the Mumford-Shaw functional) is explained in the description of FIG. 3.

As mentioned above, the gradient image segmentation system 102 fits fill functions to the closed connected partitions 205. In one or more embodiments, a fill function refers to the gradient image segmentation system 102 utilizing an algorithm or method to fill a closed area or region with a specified color or pattern. Specifically, the fill function includes mapping points within a closed connected partition to a color space. For example, the gradient image segmentation system 102 utilizes fill functions that include constant fills, piecewise constant fills, or gradient fills, which are discussed in more detail below in the description of FIG. 4.

In one or more embodiments, a gradient fill function 206 includes a function to fill a closed connected partition with a smooth transition of colors or intensities from one point of the closed connected partition to another. In contrast to a solid color, a gradient fill uses a blend of colors to create a visually appealing transition effect across the closed connected partition.

Furthermore, as shown in FIG. 2, the gradient image segmentation system 102 generates a vectorized digital image 208 according to the gradient fill function 206. For example, the vectorized digital image 208 includes various mathematical equations to define lines, shapes, and curves. In particular, the vectorized digital image 208 includes a resolution-independent image. For instance, scaling up or down the vectorized digital image 208 does not result in a loss of quality. For example, the gradient image segmentation system 102 generates the vectorized digital image 208 according to at least one gradient fill function for a closed connected partition. In other words, the gradient image segmentation system 102 generates the vectorized digital image 208 that includes gradient fill functions fitted to one or more closed connected partitions and regions without gradient fills are fitted with constant fill functions or piecewise constant fill functions.

Figure 3:
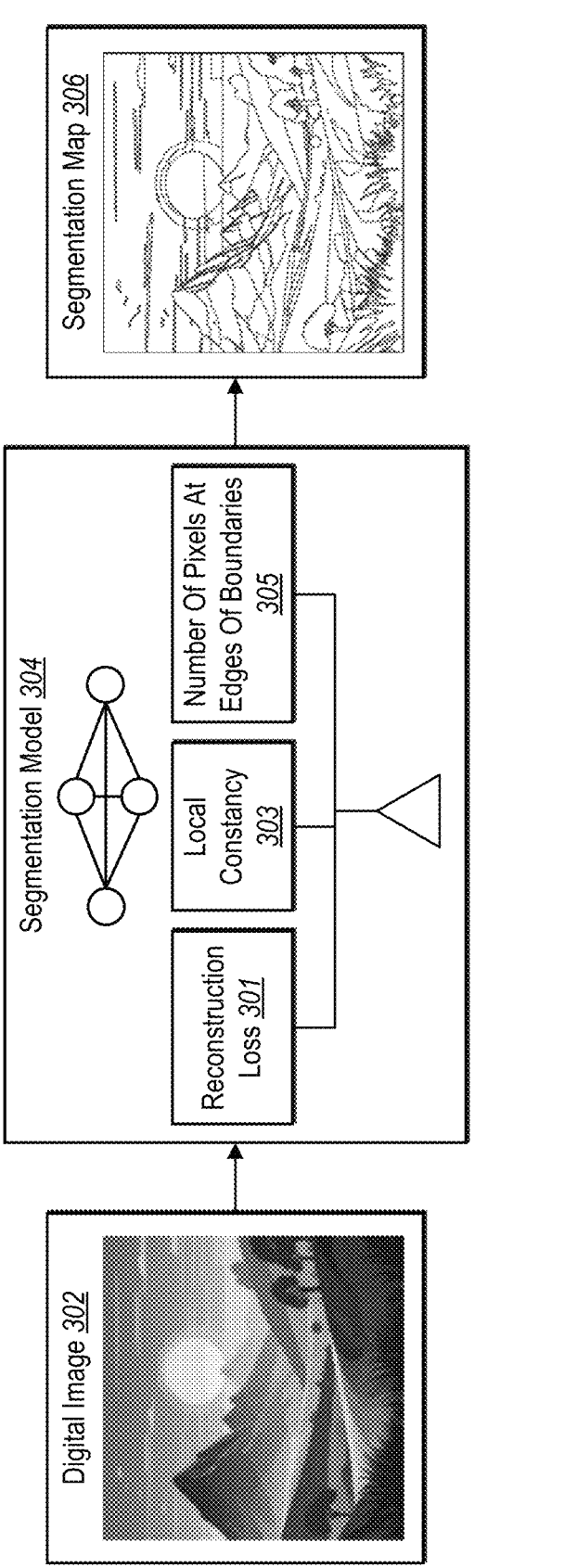
FIG. 3 illustrates an example diagram of the gradient image segmentation system balancing one or more constraints to generate a segmentation map in accordance with one or more implementations.

As mentioned above, in certain embodiments, the gradient image segmentation system 102 balances various constraints to generate a segmentation map that cluster similar pixels values while minimizing a number of boundaries. FIG. 3 illustrates an example diagram of the gradient image segmentation system 102 using a segmentation model that balances multiple constraints to generate a segmentation map in accordance with one or more embodiments. Specifically, as shown, the gradient image segmentation system 102 receives a digital image 302 (e.g., raster digital image) that contains pixel values, and further utilizes a segmentation model 304 to generate a segmentation map 306.

As mentioned above, in one or more embodiments, the gradient image segmentation system 102 utilizes the segmentation model 304 that minimizes a number of boundaries (e.g., in a segmentation map) by balancing various constraints. Specifically, in some embodiments, the gradient image segmentation system 102 utilizes a Mumford-Shaw functional to perform smoothing (e.g., reducing noise or unwanted details in an image while preserving important features) and edge detection of a digital image.

As shown, the gradient image segmentation system 102 utilizes the segmentation model 304 to balance a first constraint (e.g., reconstruction loss 301), a second constraint (e.g., local constancy 303), and a third constraint (e.g., number of pixels at edges of boundaries 305). In one or more embodiments, the gradient image segmentation system 102 determines a first constraint of the digital image. Specifically, the first constraint includes the reconstruction loss 301 (e.g., a measure of discrepancy between input data and output data) relative to the digital image 302, where the reconstruction loss 301 indicates a level of similarity of the digital image 302 with the segmentation map 306. In other words, the gradient image segmentation system 102 determines the first constraint to ensure that the segmentation map 306 resembles the digital image 302 within a threshold amount.

In one or more embodiments, the gradient image segmentation system 102 determines a second constraint of the digital image 302. Specifically, the second constraint includes a constraint on local constancy in pixel values of the digital image 302. For instance, the second constraint indicates a local level of smoothness of the digital image 302. In other words, the local constancy refers to a desire to maintain smoothness (e.g., consistency) in pixel values within neighborhoods/regions of the digital image 302. For example, the gradient image segmentation system 102 uses the second constraint to maintain spatial coherence and reduce abrupt changes or noises (e.g., within a threshold amount) in localized areas (e.g., a neighborhood region) of the digital image.

In one or more embodiments, the gradient image segmentation system 102 determines a third constraint of the digital image 302. Specifically, the third constraint includes a constraint on a number of pixels at edges of boundaries. In other words, the gradient image segmentation system 102 uses the third constraint to reduce a number of pixels which are marked as an edge to reduce the total number of boundaries in the segmentation map 306.

In one or more embodiments, the gradient image segmentation system 102 utilizes the segmentation model to minimize the number of boundaries in the digital image 302 by balancing the first constraint, the second constraint and the third constraint. In other words, the gradient image segmentation system 102 utilizes the first, second, and third constraint in an optimization problem to maximize a number of similar pixels grouped together with a minimal number of boundaries.

As shown, the gradient image segmentation system 102 generates the segmentation map 306 based on balancing the reconstruction loss 301, the local constancy 303 and the number of pixels at edges of boundaries 305 (e.g., the first, second, and third constraints). In one or more embodiments, the segmentation map 306 includes a representation of the digital image 302 that divides the digital image 302 into regions. In particular, the segmentation map 306 indicates different regions corresponding to different objects in the digital image 302 or regions (e.g., background/foreground). For example, the segmentation map 306 includes utilizing the segmentation model 304 to assign a label to each pixel of the digital image 302, where the label indicates an object or region of where the pixel belongs. Moreover, as mentioned above, the gradient image segmentation system 102 generates the segmentation map 306 that minimizes a number of boundaries within the digital image 302 while also having local smooth pixel values within each region of the segmentation map 306.

In some embodiments, the gradient image segmentation system 102 further generates closed connected partitions according to boundaries of the segmentation map 306. Specifically, the one or more closed connected partitions includes locally smooth pixel values within the digital image 302 and are constructed according to the determined boundaries of the segmentation map 306. For example, the gradient image segmentation system 102 generates the one or more closed connected partitions and fits a fill function to the one or more closed connected partitions.

The following description provides additional context for preliminary notations for fill functions and the Mumford-Shaw functional. In some embodiments, the gradient image segmentation system 102 represents a digital image (e.g., a raster image) as a two 2-dimensional array of pixels, where each pixel has 3 channel colors, namely red, blue and green. Specifically, for an image with height $H \in \mathbb{N}$ and width $W \in \mathbb{N}$, the gradient image segmentation system 102 treats each pixel as uniquely identified by its position in a 2-dimensional grid. The set of pixels $P_I$ is defined as, $$P_I := [0 \ldots H) \times [0 \ldots W)$$

In the above representation, the set $P_I$ is a strict subset of $\mathbb{R}^2$. Thus, a raster image is a map from pixel to a color, represented as:

$$I: P_I \rightarrow \mathbb{R}^3$$

In other words, the image is represented by a three-dimensional Euclidean space (x, y, z).

Furthermore, the gradient image segmentation system 102 treats the adjacency of a pixel as dictated by the connectivity criterion. For instance, in a 4-connected criteria, every pixel (i,j) is adjacent to four pixels, represented as:

$$\{(i-1,j),\ (i+1,j),\ (i,j-1),\ (i,j+1)\}$$

Similarly, in a 8-connected setting, there are 8 adjacent pixels, represented as:

$$\{(i-1,j),\ (i+1,j),\ (i,j-1),\ (i,j+1),$$
$$(i-1,j-1),\ (i+1,j-1),\ (i+1,j+1),\ (i+1,j-1)\}$$

Moreover, a path is a sequence of pixels $\{p_i,\ \ldots,\ p_n\}$ such that, for every pixel $p_i$ in the sequence, $p_i$ is adjacent to $p_{i-1}$ and $p_{i+1}$ (if they exist).

In some embodiments, the gradient image segmentation system 102 utilizes a segmentation of a raster image as a defined map from pixels to natural numbers, represented as:

$$S_I\colon P_I \to \mathbb{N}$$

Thus, the above representation indicates that the gradient image segmentation system 102 assigns each pixel a non-negative number referred to as a segment identifier. Further, in some embodiments, the partition $P_I$ of the pixels induced by the segmentation is the equivalence class defined by the equivalence relation whether they have the same segment identifier, represented as:

$$Pt := \{\{p \in P : S(p) = n\}\colon\ n \in \mathbb{N}\}^1$$

The above representation indicates that S and $P_T$ are equivalent. In other words, the gradient image segmentation system 102 derives S from $P_T$ and vice versa. Accordingly, a segmentation indicates both the map and the corresponding partition.

Moreover, in some embodiments, the gradient image segmentation system 102 utilizes fill functions to increase the resolution of a digital image. For instance, a fill function includes an algorithm or technique used to interpolate or generate additional pixel values to enhance a raster image to a higher resolution (e.g., relative to an initial resolution of the raster image). Specifically, the gradient image segmentation system 102 utilizes fill functions defined as a set of tuple of functions, represented as:

$$F := \{f \mid f\colon B \to \mathbb{R}^3,\ B \subseteq \mathbb{R}^2\}$$

In the above representation, the color function f is a mapping from points in $\mathbb{R}^2$ to the color space $\mathbb{R}^3$ and the domain of f is B (e.g., B indicates a subset of the two-dimensional Euclidean space ($\mathbb{R}^2$). Additionally, the gradient image segmentation system 102 denotes the domain of a function by Dom(f) and considers the discrete domain $P_I$ for a given image I, represented as:

$$F_I := \{f \mid f\colon B \to \mathbb{R}^3,\ B \subseteq P_I\}$$

In the above representation, B indicates a subset of the partition $P_1$ of the pixels induced by the segmentation. Furthermore, the gradient image segmentation system 102 considers F a function as well, with domain $\mathrm{Dom}(F) = U_{f \in F}$ Dom(f) and co-domain in $\mathbb{R}^3$.

$$F(p) = \sum_{\substack{f \in F \\ p \in Dom(f)}} f(p)$$

In one or more embodiments, the gradient image segmentation system 102 constructs two specific types of fill functions. Specifically, the gradient image segmentation system 102 constructs constant and linear fill functions. For instance, the gradient image segmentation system 102 defines a constant fill function as a color (parameter) $\theta \in \mathbb{R}^3$, represented as, $$f_\theta\colon B \to \mathbb{R}^3\ \text{is defined as}\ f_\theta(x) = \theta$$

Moreover, the gradient image segmentation system 102 defines a linear fill function by the following parameters, $$\theta := (st, d, L, C)$$

Where in the above notation, $st \in \mathbb{R}^2$ is the starting point (e.g., origin) of the gradient, $d \in \mathbb{R}^2$ is a direction of the gradient. In some embodiments, the stop sequence is given by a sequence represented as, $$L := \{(l_i, c_i)\}_{0 \le i < n}$$

In the above notation, $l_i \in \mathbb{R}$ and $l_i < l_{i+1}$ and $c_i \in \mathbb{R}^3$. In some embodiments the linear function $f_\theta\colon \mathbb{R}^2 \to \mathbb{R}^3$ is represented as, $$f_\theta(x) := \begin{cases} c_0, & \text{if } x^T \cdot d < 0 \\ r_i c_{i+1} + (1 - r_i)c_i, & \text{if } l_i \le x^T \cdot d \le l_{i+1}\ \text{where}\ r_i = \dfrac{x^T \cdot d - l_i}{l_{i+1} - l_i} \\ c_n, & \text{if } x^T \cdot d > l_n \end{cases}$$

As mentioned above, the gradient image segmentation system 102 uses a Mumford-Shaw functional to balance the reconstruction loss 301, the local constancy 303, and the number of pixels at edges of boundaries 305. Specifically, the gradient image segmentation system 102 represents the Mumford-Shaw function for image I as, $$E_I[f] := \alpha \sum_{x \in P} (f(x) - I(x))^2 + \beta \sum_{\partial B(x) = 0} (\nabla f(x))^2 + \gamma \sum_{\partial B(x) = 1} 1$$

In the above notation, $f: B \rightarrow \mathbb{R}^3$, where a fill function is defined on a set $B \subseteq P_J$. For instance, a minimum solution for the functional $E_J$ defines a fill function and a corresponding boundary function, where the function has three parts. The first part (e.g., the first constraint) defines the reconstruction loss, the second part (e.g., the second constraint) defines the fact that our function needs to be locally constant, and the third term (e.g., the third constraint) tries to reduce the number of pixels which are marked as edge.

In one or more embodiments, the gradient image segmentation system 102 uses the Mumford-Shaw function to smoothen the digital image 302, reduce noise in the digital image 302, and sharpen edges in the digital image 302. Specifically, the gradient image segmentation system 102 utilizes the Mumford-Shaw function to find a solution in terms of f and B that minimizes the functional. Furthermore, in some embodiments, the gradient image segmentation system 102 uses the hyperparameters $\alpha$, $\beta$, and $\gamma$ to push the optimal function towards a particular goal. Specifically, increasing $\gamma$ reduces the number of pixels that are marked as boundary and increasing $\beta$ makes $f$ more locally constant.

Figure 4:
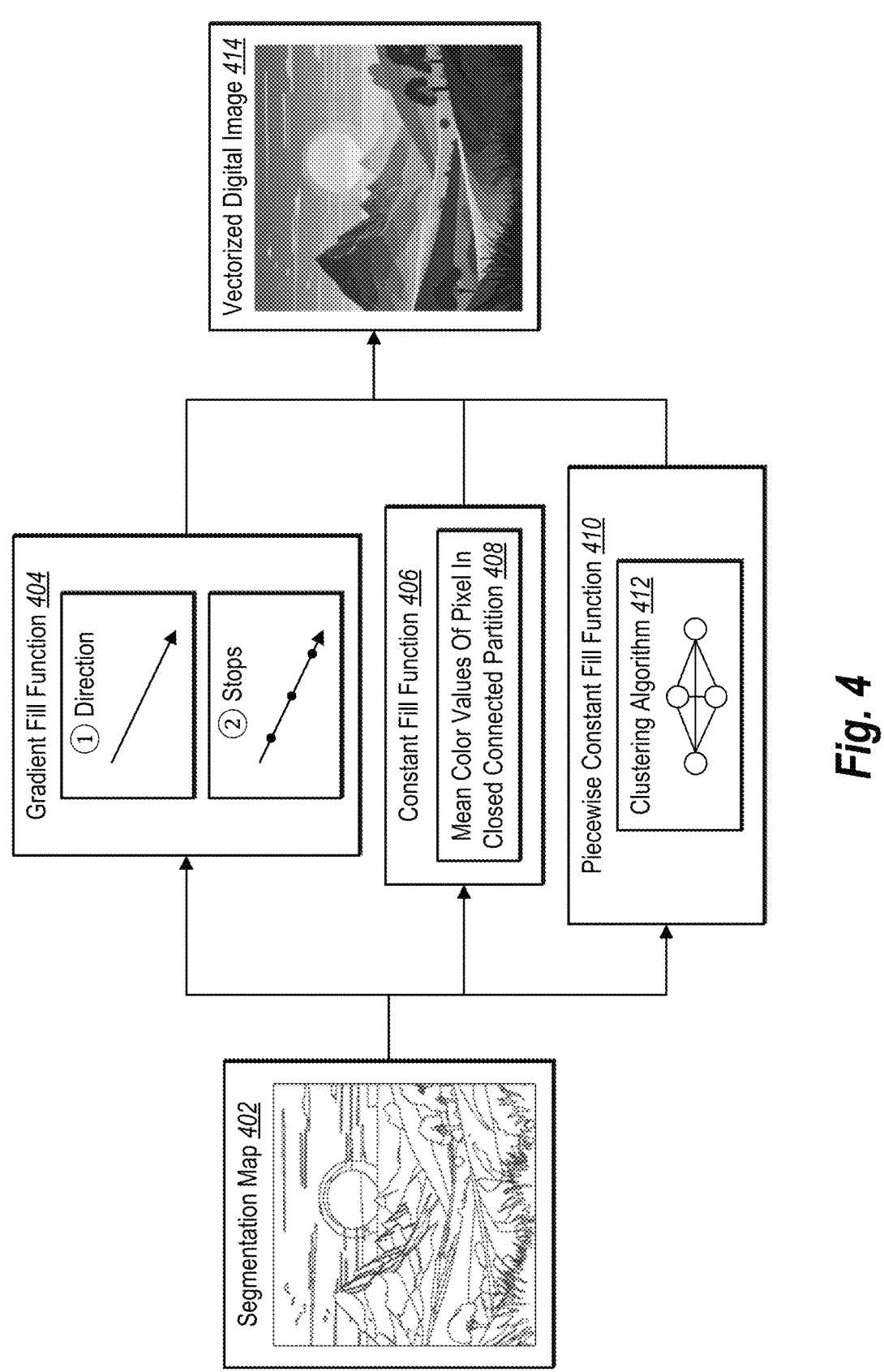
FIG. 4 illustrates an example diagram of the gradient image segmentation system selecting from at least one of a gradient fill function, a constant fill function, or a piecewise fill function in accordance with one or more implementations.

As mentioned above, the gradient image segmentation system 102 selects from multiple fill functions to fit to a closed connected partition. FIG. 4 illustrates an example diagram of the gradient image segmentation system 102 selecting at least one of a gradient fill function, a constant fill function, or a piecewise constant fill function in accordance with one or more embodiments.

As shown in FIG. 4, the gradient image segmentation system 102 accesses a segmentation map 402 and fits one or more fill functions to one or more closed connected partitions of the segmentation map 402. FIG. 4 shows the gradient image segmentation system 102 selecting from a gradient fill function 404, a constant fill function 406, and a piecewise constant fill function 410. The gradient fill function 404 was discussed above in the description of FIGS. 2 and 3. FIG. 4 additionally shows the gradient image segmentation system 102 determining (e.g., as part of the gradient fill function 404) a direction of a gradient and stops along the gradient.

A brief overview of the process for determining a fill function for a segmentation (e.g., which includes discontinuity aware segmentation) is provided here. Additional details of using discontinuity aware segmentation is provided in detail below in FIGS. 7-9. For instance, a high-level overview of the process of execution shown in FIG. 4 includes 1) the gradient image segmentation system 102 using the Mumford-Shaw function for smoothing an image, 2) the gradient image segmentation system 102 identifying closed connected regions (e.g., connected components) using edges detected in an image, 3) for each closed connected region, the gradient image segmentation system 102 performs a solid color segmentation and uses the solid color segmentation to create a discontinuity aware segmentation (described in detail below in FIGS. 7-9) to yield a final or refined segmentation, 4) for each of the segmentations (e.g., created from the discontinuity aware segmentation) the gradient image segmentation system 102 uses one of the gradient fill function 404, the constant fill function 406, the piecewise constant fill function 410, or a radial gradient (e.g., the gradient image segmentation system 102 uses the gradient with the least amount of L1 error).

In one or more embodiments, the gradient image segmentation system 102 computes a gradient for a region of the segmentation map 402 by using discontinuity aware segmentation. For example, the gradient image segmentation system 102 performs a segmentation of a smoothened image (e.g., a smoothened image obtained via the Mumford Shaw functional) by using an edge detector (e.g., to determine a discontinuity mask) and a segmentation model (e.g., to determine closed connected regions in the smoothened image). In doing so, the gradient image segmentation system 102 accounts for discontinuities and does not mistakenly group pixel values that are not within the same boundary as being in the same boundary. As just mentioned, the gradient image segmentation system 102 uses an edge detector. For instance, the gradient image segmentation system 102 starts with detecting edges in a smoothened image by traversing the smoothened image to identify groups of pixels. Specifically, the gradient image segmentation system 102 uses the detected edges to obtain the closed connected regions using the algorithm described below (e.g., described as Algorithm 1). Moreover, the gradient image segmentation system 102 uses each closed connected region (e.g., a connected component in the smoothened digital image) to fit a fill function (e.g., the gradient fill function 404, the constant fill function 406, or the piecewise constant fill function 410) based on a fill function minimizing the amount of error (e.g., L1 error, which refers to mean absolute error to quantify the difference between a predicted value and an actual value for reconstructing a digital image).

As shown in FIG. 4, the gradient image segmentation system 102 determines a direction and stops for a gradient fill function. In one or more embodiments, a direction refers to an orientation or path along which colors transition within a closed connected partition. In other words, a direction of a gradient determines how colors blend from one end of the gradient to another end of the gradient. For example, the gradient image segmentation system 102 determines a direction of a gradient fill based on the direction aligning a threshold number of pixels within the closed connected partition.

To illustrate, the gradient image segmentation system 102 determines a direction of a gradient fill function within a closed connected partition based on determining x and y components of all the pixels and identifying a direction (e.g., theta) that aligns with the majority of the pixels. For instance, the gradient image segmentation system 102 computes the gradient direction as an angle that a pixel makes with a positive x-axis. Furthermore, the gradient image segmentation system 102 computes a derivative of the x and y components of the gradient with respect to a quadratic equation.

For instance, the gradient image segmentation system 102 considers a single pixel with a corresponding pixel value and also considers a neighboring pixel with a corresponding pixel value. If the single pixel is red (e.g., a pixel value of 50) and the neighboring color has a pixel value of 100, then the change in the red channel from the single pixel to its neighbor is 50 (e.g., 100–50). In other words, the gradient image segmentation system 102 considers each individual pixel and identifies transitions from each individual pixel to its neighbor to determine a direction gradient (e.g., theta is the most aligned direction based on the neighboring pixels in the x direction and the neighboring pixels in the y direction).

As also shown, the gradient image segmentation system 102 determines one or more stops for the gradient fill. Specifically, a stop within a gradient fill refers to specific points along a gradient line where color or opacity values are defined. For example, the stops indicate how colors transition within the gradient, which allows for precise control over the appearance and behavior of the gradient fill. For instance, the gradient image segmentation system 102 determines one or more stops along a gradient fill based on a threshold change in a rate of change of the direction of the gradient.

To illustrate, the gradient image segmentation system 102 represents the color of a closed connected partition as defined by a linear gradient, and all pixels perpendicular (e.g., orthogonal) to the direction line has the same color (e.g., as defined by the stops). In other words, the gradient image segmentation system 102 identifies sharp changes (e.g., within a threshold amount) in the rate of change (e.g., the derivative) of a direction line of the gradient.

In one or more embodiments, the gradient image segmentation system 102 estimates the linear fill function (e.g., the gradient fill) as follows, given a subset of pixels ASP, the gradient image segmentation system 102 finds the linear fill function $f$ which best approximates the pixels in A, represented as, $$\min_{f} \sum_{p \in A} (I(p) - f(p))^2$$

Furthermore, the gradient image segmentation system 102 identifies the parameters of a linear function that approximates a color of a partition (e.g., a closed connected partition), where the color gradient is represented as, $$dC = \left[ \overrightarrow{dC_R} \ \overrightarrow{dC_G} \ \overrightarrow{dC_B} \right] = \left[ \left( \frac{\partial C_R}{\partial x}, \frac{\partial C_R}{\partial y} \right) \left( \frac{\partial C_G}{\partial x}, \frac{\partial C_R}{\partial y} \right) \left( \frac{\partial C_B}{\partial x}, \frac{\partial C_B}{\partial y} \right) \right]$$

The gradient image segmentation system 102 calculates the above notation using a Sobel filter described in Nick Kanopoulos, Nagesh Vasanthavada, and Robert L. Baker, Design of an image edge detection filter using the sobel operator, *IEEE Journal of solid-state circuits*, 23(2):358-367, 1988. Using the Sobel filter, the above notation is rewritten as, $$E(\theta) := \sum (G_x \cos\theta + G_y(p)\sin\theta)^2$$

The above notation accommodates a closed form solution represented as, $$\tan\theta = \frac{b \pm \sqrt{b^2 - 4a^2}}{2a}, a = \sum G_y(p)G_x(p), b = \sum G_y(p)^2 - G_x(p)^2$$

For instance, the above closed form solution yields a parameter d, a starting point st as the center of mass of the closed connected partition, a length sequence L, and a color sequence C (e.g., determined by processing the color distribution by projecting each pixel of the closed connected partition on the line passing through st and slope d).

As further shown in FIG. 4, in some embodiments, the gradient image segmentation system 102 selects the constant fill function 406. Specifically, FIG. 4 shows that the constant fill function 406 includes mean color values 408 of pixel in closed connected partition. In one or more embodiments, the constant fill function 406 refers to the gradient image segmentation system 102 using an algorithm or method to fill a closed connected partition with a single, uniform, color or pattern. Unlike the gradient fill, the constant fill (determined from the constant fill function 406) applies a uniform color or pattern across the entire closed connected partition and does not have transitions between color or intensity. In one or more embodiments, the gradient image segmentation system 102 fits a constant fill function $f$ in a given region A using the mean color values 408 of the pixels in the region, represented as, $$f: A \to \left\{ \frac{\sum_{p \in A} I(p)}{|A|} \right\}$$

As further shown, in some embodiments, the gradient image segmentation system 102 selects the piecewise constant fill function 410 that includes a clustering algorithm 412 to represent color transitions in a portion of a digital image. In one or more embodiments, the piecewise constant fill function 410 refers to an algorithm or method used to fill a region with distinct constant colors or patterns defined across different segments or pieces of the closed connected partition. In contrast to a constant fill (which fills the entire closed connected partition with a single color), the piecewise constant fill function 410 allows different parts of the region to be filled with different constant values. For example, the gradient image segmentation system 102 divides a closed connected partition into multiple pieces where each piece is for a distinct constant color or pattern. In one or more embodiments, the gradient image segmentation system 102 selects the piecewise constant fill function 410 for a portion of a digital image instead of the gradient fill function 404 in response to determining that a fill function results in inaccurate reconstruction of the digital image in the vector space (e.g., due to a determined error value).

In one or more embodiments, the gradient image segmentation system 102 uses a piecewise constant fill function to approximate a region R which is obtained via the clustering algorithm 412. For instance, the gradient image segmentation system 102 utilizes the clustering algorithm 412 to treat the color or each pixel in the partition as a feature vector. Further, the output of the clustering algorithm 412 assigns each pixel a label, where pixels in the same color cluster have the same label. In doing so, the gradient image segmentation system 102 utilizes the clustering algorithm 412 to generate a segmentation $S_R$. From the segmentation, the gradient image segmentation system 102 further determines a partition $Pt_R$ over R, however the determined partition is not always connected. Thus, the gradient image segmentation system 102 uses a connectivity relation to create a closed connected partition, which is shown below in algorithm 2.

In one or more embodiments, the gradient image segmentation system 102 utilizes algorithm 1 to traverse a raster digital image.

---

Algorithm 1 traverse

---

Require: Pixel p, V: P' → {0,1}, S : P' → ℕ
Ensure: A ⊆ P', where A:= {p'| p~p' and S(p') = S(p)}
   Q←[p]
   A← Φ
   While Q ≠ Φ do
      S← Q.pop( )
      V(s) = 1
      for q ∈ adjacent(s) do
         if V(q) = 0 and S(q) = S(p) then -continued

| Algorithm 1 traverse |
| --- |
| Q.push(q) |
| A ← A ∪{q} |

In other words, the gradient image segmentation system 102 utilizes algorithm 1 to traverse the raster digital image and identify all the pixels that belong together (e.g., depending on the edges within the raster digital image).

In addition, the gradient image segmentation system 102 utilizes algorithm 2 to connect boundaries of regions within the raster digital image.

| Algorithm 2 Connected component partition |
| --- |
| Require: A segmentation S: P' →ℕ, P' is a set of pixels. |
| Ensure: A partition $P_t = \{P_1,..., P_n\}$, where $\forall P_i$ is connected. |
|   V: P' → {0,1}, initialized as $\forall_p V(p) = 0$ |
|   $P_t$ ← { } |
|   For p ∈ P' do |
|     If V(p) = ( ) then |
|       $P_t$ ← $P_t$ ∪ traverse (p, V, S) |

In one or more embodiments, the gradient image segmentation system 102 has an objective to find a set of constant and linear fill functions (e.g., gradient fills) to reconstruct the raster digital image. For instance, the gradient image segmentation system 102 formulates this as an optimization problem of a functional form. In one or more embodiments, $\mathcal{F}$ represents the set of all finite set of fill functions with F∈ $\mathcal{F}$ and F:={$f_1$, . . . , $f_n$}, such that F has the following properties (1) all f∈F is either constant or linear, (2) for all f∈F, Dom(f) is connected, (3) the set of domain of functions in F defines a partition Pt on P, which also yields a segmentation S, represented as, $$\forall_{i \neq j} Dom(f_i) \cap Dom(f_j) = \emptyset \text{ and } U_{f \in F} Dom(f) = P$$

Moreover, for the following functional on $\mathcal{F}$:

$$E[F] := \alpha \sum_{\substack{f_i \in F \\ B_i \in Pt}} \sum_{p \in B_i} (I(p) - f_i(p))^2 + \gamma \sum_{f_i \in F} 1$$

an optimal solution to the functional gives a minimal set of constant or linear fill function to reconstruct the image.

In one or more embodiments, the gradient image segmentation system 102 uses a pre-processing step that invokes the Mumford-Shaw algorithm to obtain an approximate representation I' of the image which is locally smooth and gives us a boundary function B. For instance, the gradient image segmentation system 102 solves the Mumford-Shaw functional using a primal dual algorithm (e.g., simultaneously constructing an approximate solution and a feasible solution) to iteratively refine the solution towards optimal segmentation, represented as, $$\alpha \sum_{x \in P} (f(x) - I(x))^2$$

The above notation shows a data term and a regularization term which penalizes the length of edges and the variation within regions. Specifically, the above notation alternates between updating the primal variables (e.g., the segmentation) and the dual variables (e.g., associated with the constraints). Furthermore, the gradient image segmentation system 102 utilizes the above notation and determine an ending point when the functional converges or reaches a specified threshold. For instance, after convergence, the gradient image segmentation system 102 applies a threshold to mark edge pixels (e.g., to create the closed connected partitions).

In one or more embodiments, the boundary function B defines the pixels where there is a sharp transition in color, where the pixels with sharp color transitions are called edges of the images. For instance, the gradient image segmentation system 102 uses these edges to define a subset of P. Further, in the smooth partitioning step, the gradient image segmentation system 102 partitions the digital image to yield $Pt_s \subseteq 2^{P_i B}$ using a connectivity equivalence relation ~, where the connectivity relation ~ is defined as, A pixel p~p' if there exist a path joining p and p' in the set P\B.

The equivalence class of ~yields the partition $Pt_s$ on (P\B) and the gradient image segmentation system 102 calculates a partition by graph traversal. For instance, the gradient image segmentation system 102 uses algorithm 2 shown above, where the input segmentation map S:P'→{1} has the domain P':=P\B and each region of the resulting partition Pt has the following properties: (1) the color values of each pixel within a region are locally smooth, which follows from the fact that pixels in (P\B) are locally smooth; and (2) each element of the partition is a connected subset of P, which follows from the construction. Thus, based on the above description, the gradient image segmentation system 102 fits a fill function to each region of the partition by selecting from the gradient fill function 404, the constant fill function 406, and the piecewise constant fill function 410.

As shown in FIG. 4, the gradient image segmentation system 102 selects one or more of the gradient fill function 404, the constant fill function 406, and the piecewise constant fill function 410 to fit to the closed connected partitions of the digital image (e.g., based on boundaries in the segmentation map 402). Additionally, the gradient image segmentation system 102 generates a vectorized digital image 414 based on the various fill functions.

Figure 5:
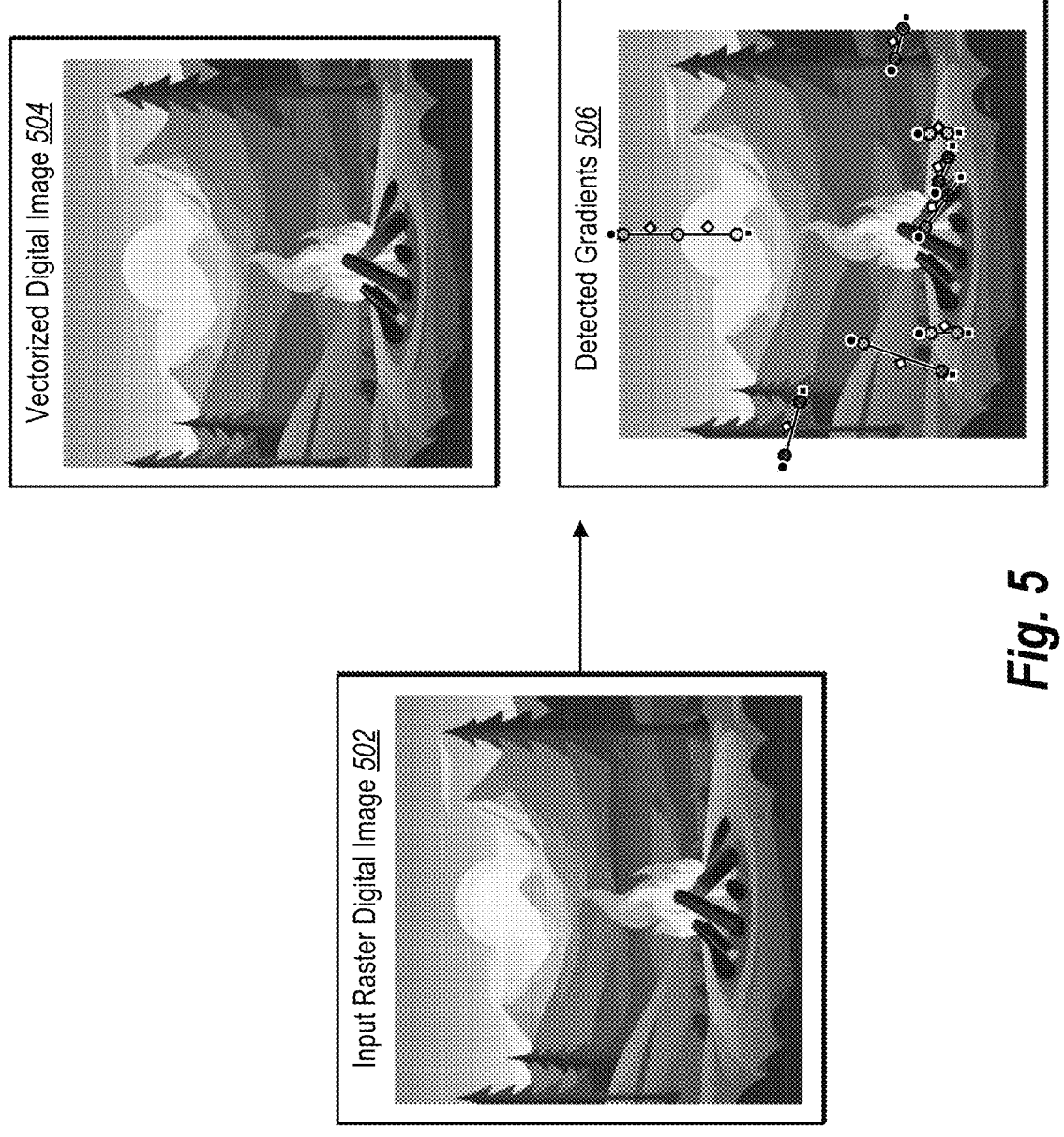
FIG. 5 illustrates an example diagrams of the gradient image segmentation system generating a vectorized digital image according to detected gradients within a raster digital image in accordance with one or more implementations.

As mentioned above, the gradient image segmentation system 102 generates a vectorized digital image according to detected gradients within a raster digital image. FIG. 5 illustrates the gradient image segmentation system 102 processing a raster digital image, identifying pixels to fit a gradient fill function, and generating a vectorized digital image in accordance with one or more embodiments.

FIG. 5 shows the gradient image segmentation system 102 receiving an input raster digital image 502. Specifically, the input raster digital image 502 depicts a campfire with mountains, hills, trees, and a sunset in the background. Additionally, from the input raster digital image 502, the gradient image segmentation system 102 uses a segmentation model to generate a segmentation map of the input raster digital image 502 that clusters together pixel values and minimizes the number of boundaries. In particular, as described above, the gradient image segmentation system 102 balances a first, second, and third constraint to obtain a minimal number of boundaries in a segmentation map of the input raster digital image 502.

As further shown, FIG. 5 illustrates detected gradients 506 in the input raster digital image 502. Specifically, the detected gradients 506 shows the sky, some of the trees, some of the hills, and part of the campfire encompassing pixels where the gradient image segmentation system 102 fits gradient fill functions. Moreover, the detected gradients 506 also show a direction of the gradient and multiple stops for each gradient. Further, for the portions of the input raster digital image 502 in addition to the detected gradients 506, the gradient image segmentation system 102 selects from a constant fill function or a piecewise constant fill function. Thus, as shown in FIG. 5, the gradient image segmentation system 102 generates a vectorized digital image 504 according to the detected gradients 506.

Figure 6:
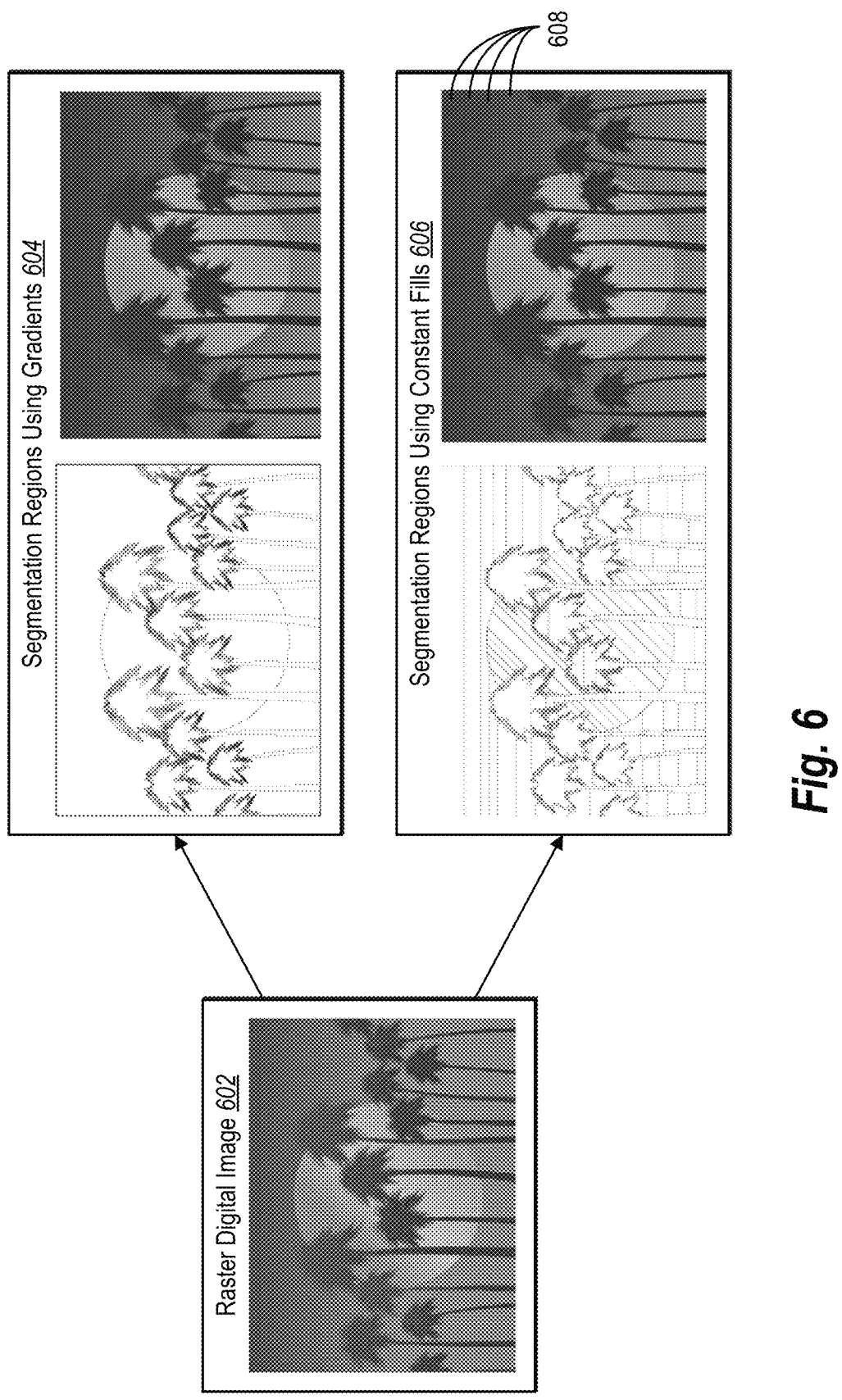
FIG. 6 illustrates an example diagram of the gradient image segmentation system generating segmentation regions using gradients and segmentation regions using constant fills in accordance with one or more implementations.

As mentioned above, the gradient image segmentation system 102 generates higher quality vectorized digital image relative to conventional vectorization systems. FIG. 6 illustrates an example diagram of the gradient image segmentation system 102 generating segmentation regions using gradient fills and segmentation regions just using constant fills.

As shown, the gradient image segmentation system 102 receives a raster digital image 602 with vibrant colors (e.g., purples, reds, pinks, and oranges, however FIG. 6 depicts the digital image with various grayscale shades) and palm trees in front of the sun. Moreover, FIG. 6 shows the gradient image segmentation system 102 generating segmentation regions using gradients 604. In the segmentation regions using gradients 604, FIG. 6 shows a segmentation map with segmentation boundaries for the sun, and the plurality of trees shown in the image. In contrast, for segmentation regions using constant fills 606, FIG. 6 shows a lot more segmentation regions (e.g., relative to the segmentation regions using gradients 604). Specifically, the segmentation regions for the segmentation regions using constant fills 606 shows many divisions within the sun and the sky background.

As illustrated by FIG. 6, the vectorized digital image that results from the segmentation regions using gradients 604 shows smooth transitions between colors (e.g., the grayscale shading) and different regions without showing blocks of solid colors (e.g., banding 608). In contrast, the vectorized digital image resulting from the segmentation regions using constant fills 606 shows the banding 608 for each of the solid colors of the sky and the sun. In other words, the vectorized digital image resulting from just using constant fills results in sharp transitions and a lower quality image than the vectorized digital image resulting from using gradients.

Although FIGS. 1-6 discuss the gradient image segmentation system 102 in context of a linear gradient fill, in one or more embodiments, the gradient image segmentation system 102 fits at least one radial gradient fill to one or more closed connected partitions. Specifically, a radial gradient fill refers to a color gradient where colors radiate outward from a central point. For example, a radial gradient fill creates a smooth transition between colors and gives an appearance of colors moving outwards from a central origin. For instance, the gradient image segmentation system 102 identifies a start point (e.g., a central point), an end point where the outer boundary of the gradient ends, color stops, and a shape of the gradient (e.g., circular or elliptical).

Figure 7:
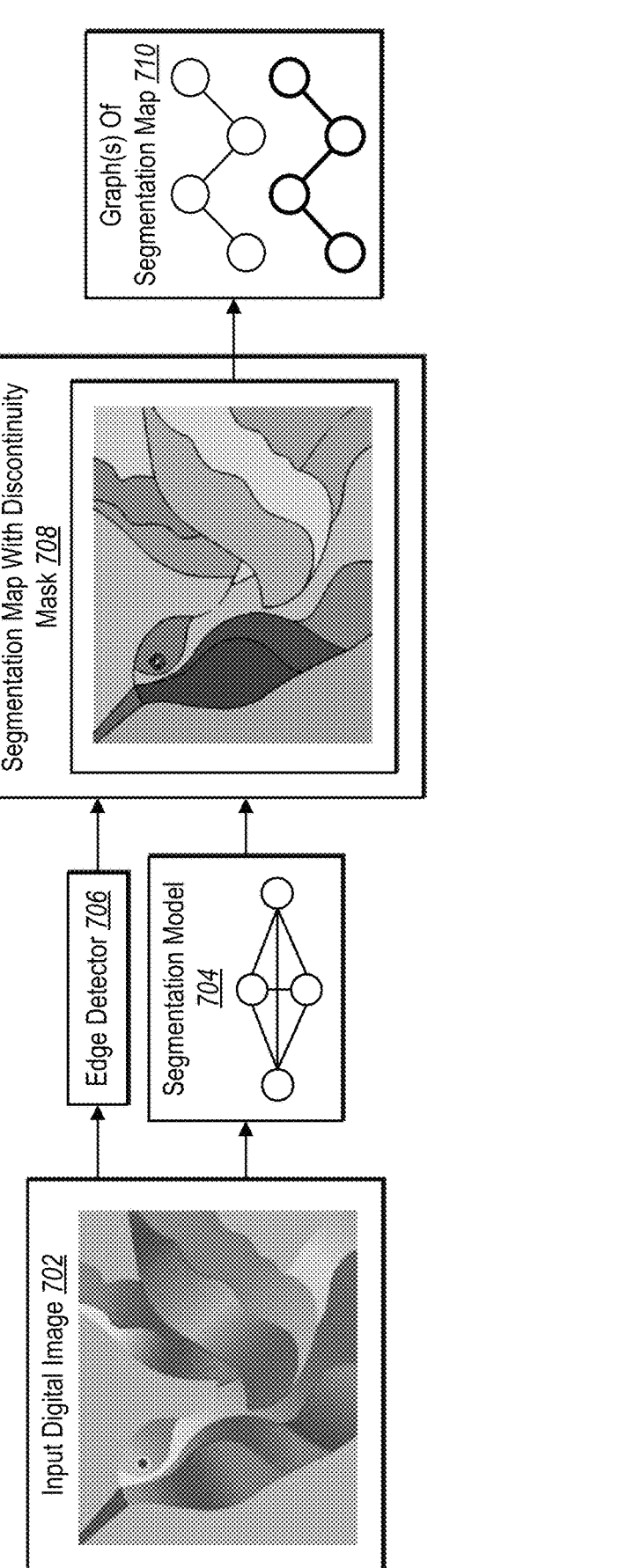
FIG. 7 illustrates an example diagram of the gradient image segmentation system identifying discontinuities within an input digital image to generate graphs of segmentation maps in accordance with one or more implementations.
Figure 8:
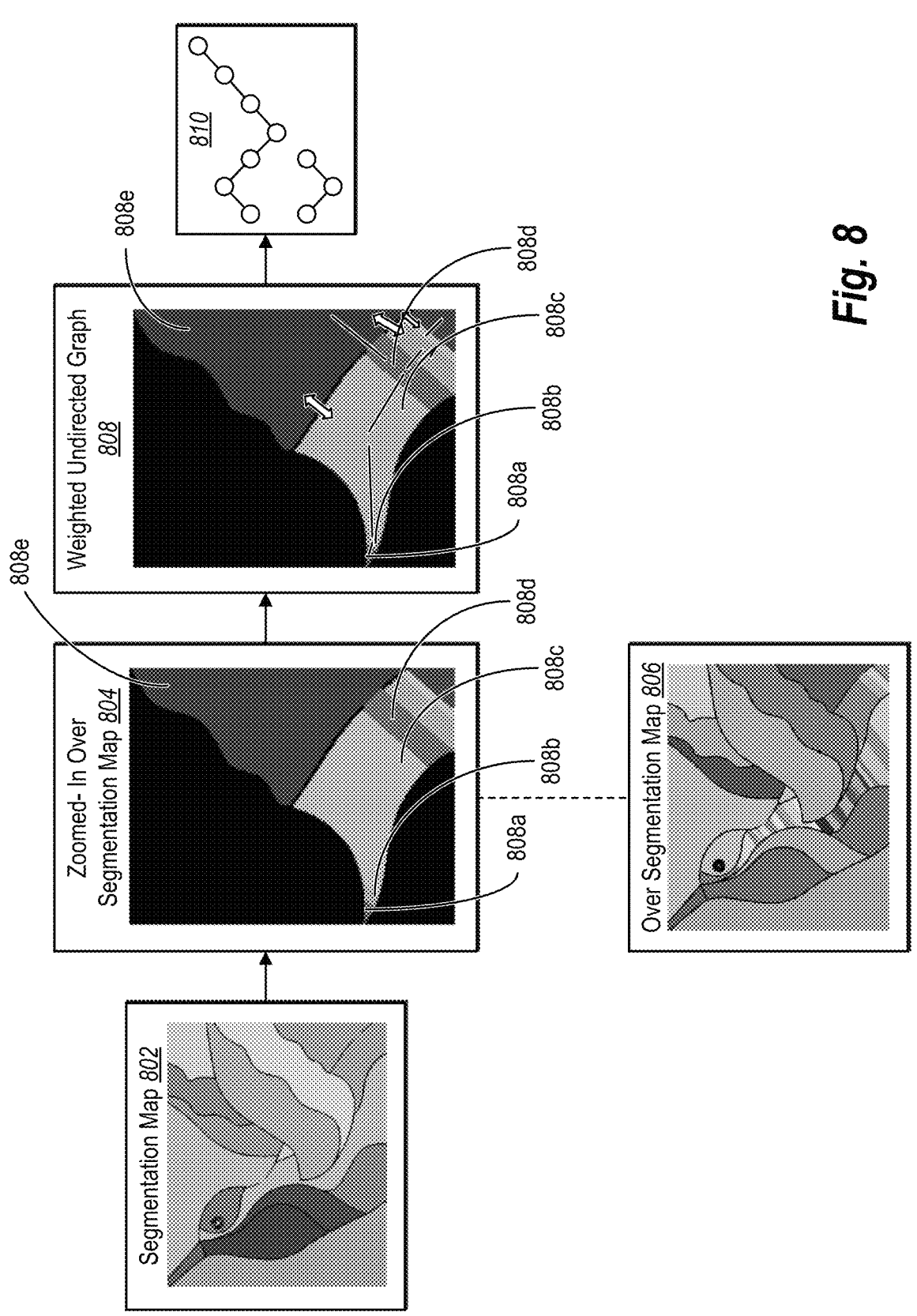
FIG. 8 illustrates an example diagram of the gradient image segmentation system generating graphs to update one or more closed connected partitions in accordance with one or more implementations.
Figure 9:
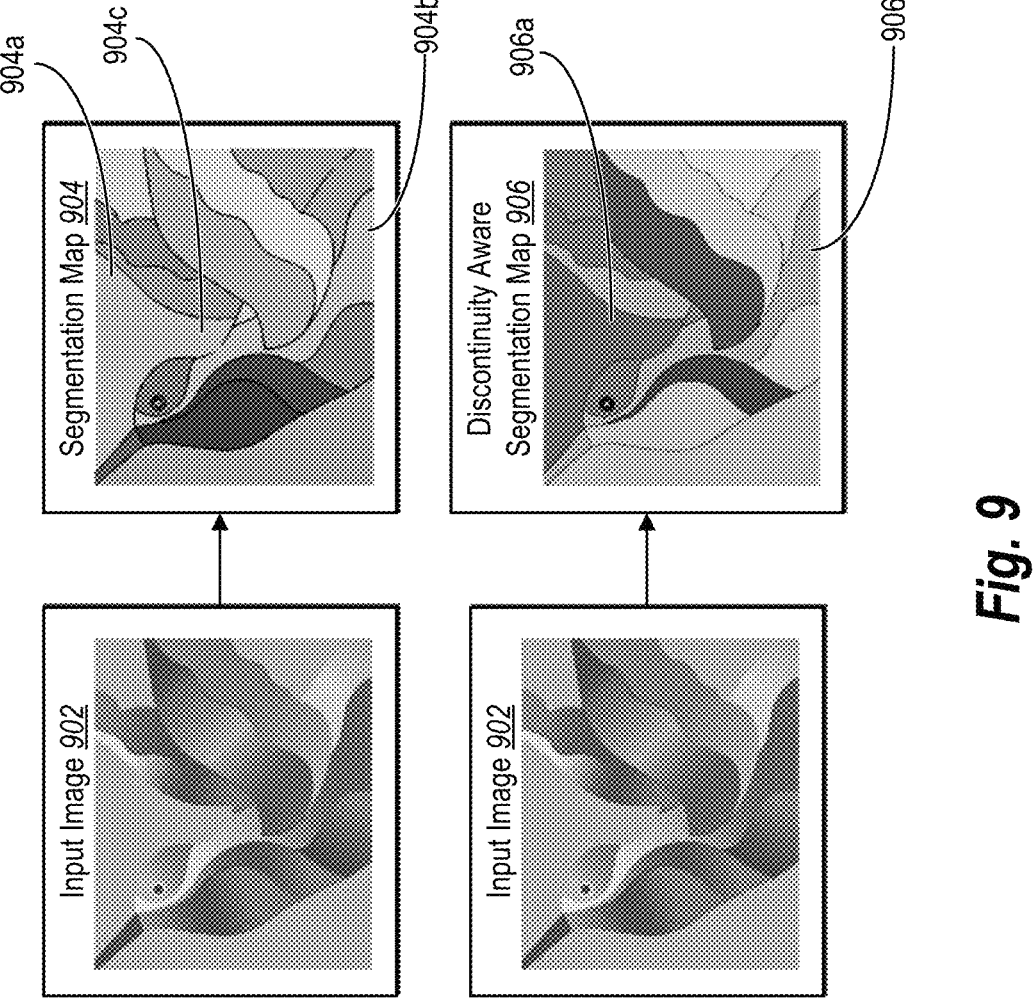
FIG. 9 illustrates an example diagram of the gradient image segmentation system performing discontinuity aware segmentation in accordance with one or more embodiments.

As mentioned above, the gradient image segmentation system 102 leverages the discontinuity aware segmentation in a pipeline that includes 1) the gradient image segmentation system 102 using the Mumford-Shaw functional for smoothing a digital image, 2) identifying closed connected region from edges detected in a digital image, 3) performing solid color segmentation for the closed connected regions and using the solid color segmentations, further creating discontinuity aware segmentations to yield a final segmentation, and 4) fitting a fill function to the final/refined segmentation based on minimizing an L1 error. FIGS. 7-9 provide additional details of the gradient image segmentation system 102 performing the discontinuity aware segmentation.

As mentioned above, the gradient image segmentation system 102 maintains a balance between image fidelity and simplified geometry by performing discontinuity aware segmentation. FIG. 7 illustrates the gradient image segmentation system 102 identifying discontinuities in a segmentation map of an input digital image and generating one or more graphs for the segmentation map in accordance with one or more embodiments. In one or more embodiments, the gradient image segmentation system 102 performs discontinuity aware segmentation, which refers to an objective to partition locally smooth pixel regions of an image such that additional pixel values that do not share the same boundary (e.g., are across a discontinuity) are in different regions. Further, as part of discontinuity aware segmentation, the gradient image segmentation system 102 minimizes the number of regions and each region accommodates a smooth fill function. Specifically, the gradient image segmentation system 102 treats discontinuity aware segmentation as a graph optimization problem.

As shown in FIG. 7, the gradient image segmentation system 102 receives an input digital image 702 and processes the input digital image 702 with an edge detector 706. Specifically, the gradient image segmentation system 102 utilizes the edge detector 706 to slide across predetermined kernel sizes (e.g., a convolutional filter) of the input digital image 702. For instance, the gradient image segmentation system 102 uses the edge detector to detect sudden changes in color values as the edge detector slides across the input digital image 702.

Additionally, as shown, the gradient image segmentation system 102 also processes the input digital image 702 using a segmentation model 704. Specifically, as part of using the segmentation model 704, the gradient image segmentation system 102 generates a segmentation map that divides up the input digital image 702 based on the principles discussed above in FIGS. 1-6. In other words, the gradient image segmentation system 102 generates a segmentation map by balancing multiple constraints to cluster pixel values together with a minimal number of boundaries.

As shown in FIG. 7, from processing the input digital image 702 with the edge detector 706 and the segmentation model 704, the gradient image segmentation system 102 generates a segmentation map with discontinuity mask 708. Specifically, the discontinuity mask 708 shown in FIG. 7 includes the black pixels (e.g., black outline) corresponding to edges/boundaries in the segmentation map.

In one or more embodiments, the discontinuity mask shown in FIG. 7 does not define closed regions, but abrupt changes in intensity or color. For instance, the gradient image segmentation system 102 determines the closed connected regions using the segmentation model 704 and uses the edge detector 706 to determine the discontinuity mask 708 (e.g., which indicates a threshold change in color or intensity). For example, the gradient image segmentation system 102 utilizes an edge detector to apply Gaussian blurs to the input digital image 702 (e.g., to reduce the noise in the input digital image 702) and then finds/locates edges in the input digital image 702 (e.g., by traversing the entire image). As illustrated in FIG. 7, the segmentation map with discontinuity mask 708 shows different regions with discontinuities (e.g., gaps in segmented boundaries). Without accounting for discontinuities, prior systems mistakenly group pixel values that are not within the same boundary as being in the same boundary.

Rather than allowing pixel values to be grouped with additional pixel values not within the same boundary, in some embodiments, the gradient image segmentation system 102 performs discontinuity aware segmentation. As mentioned above, the gradient image segmentation system 102 treats discontinuity aware segmentation as a graph optimization problem and generates graph(s) 710 of the segmentation map. In particular, the gradient image segmentation system 102 generates graph(s) 710 to represent the various regions of the segmentation map and further relies on the graphs to update the closed connected partitions (discussed above). Additional details of generating the graph(s) are given below in the description of FIG. 8.

FIG. 8 illustrates an example diagram of the gradient image segmentation system 102 generating an over segmentation map and further generating graph(s) from the over segmentation map in accordance with one or more embodiments. For example, FIG. 8 shows the gradient image segmentation system 102 processing a segmentation map 802 to create an over segmentation map 806 (e.g., represented as Sc). In one or more embodiments, the over segmentation map 806 includes a detailed division of a digital image into many small regions or segments, such as by dividing a single segmentation region of the segmentation map 802 into a plurality of separate regions based on color transitions (e.g., due to a gradient). For instance, the gradient image segmentation system 102 uses a color-based segmentation method to classify each pixel in an image into a particular category.

FIG. 8 further shows a corresponding zoomed-in portion of the over segmentation map 806. Specifically, FIG. 8 shows zoomed-in over segmentation map 804. As shown in FIG. 8, from the zoomed-in over segmentation map 804, the gradient image segmentation system 102 generates a weighted undirected graph 808 ($G_C$) using the regions of the zoomed-in over segmentation map 804. For example, the gradient image segmentation system 102 generates the weighted undirected graph 808 by generating a plurality of nodes, where each node represents closed connected partitions of the one or more closed connected partitions (e.g., utilizing color-based segmentation). In other words, the gradient image segmentation system 102 generates a node for a first region 808a, a second region 808b, a third region 808c, a fourth region 808d, etc., each corresponding to a separate color-based segmentation region.

In addition to generating a plurality of nodes, in some embodiments, the gradient image segmentation system 102 determines an order for the plurality of nodes based on weighted sums of differences in sizes and colors of the plurality of nodes. In other words, the gradient image segmentation system 102 uses a heuristic (e.g., discussed in more detail below) to order the nodes in a graph based on a size of the color partition (e.g., closed connected partition) and a difference in the colors of the nodes. For instance, the gradient image segmentation system 102 further generates edges between each of the nodes based on the determined order of the nodes in the graph.

In one or more embodiments, a node refers to an element of a graph that represents a discrete entity or object within the graph. Specifically, the node represents a color region of the digital image. Moreover, in some embodiments, the gradient image segmentation system 102 connects nodes of the graph based on whether the nodes are within the same boundary. In other words, different nodes (e.g., color regions) are connected via edges when they are within the same closed connected partition.

As shown, in the weighted undirected graph 808, the first region 808a, the second region 808b, and the third region 808c are all within the same boundary. To illustrate, the gradient image segmentation system 102 generates a first edge between a first node (e.g., the first region 808a) and a second node (e.g., the second region 808b) based on the first node and the second node being within the same boundary. Additionally, the gradient image segmentation system 102 generates a second edge between the second node and a third node (e.g., the third region 808c) based on the second node and the third node being within the same boundary. Further, the gradient image segmentation system 102 generates a third edge between the third node and a fourth node (e.g., the fourth region 808d) based on the third node and the fourth node also being within the same boundary.

Additionally, the gradient image segmentation system 102 generates a fourth edge between the fourth node (e.g., the pink region 808d) and a fifth node (e.g., a fifth region 808e). However, in some embodiments, the gradient image segmentation system 102 determines that the first node, the second node, the third node, and the fourth node are not within the same boundary, as shown in the zoomed-in over segmentation map 804 according to the boundary gap. More specifically, although the boundary gap causes the fourth region 808d and the fifth region 808e to appear to be part of the same region, the gradient image segmentation system 102 utilizes the graph-cut operations described below to separate the corresponding nodes into separate graphs via the weighted undirected graph 808, and therefore, into separate segmentation regions.

In one or more embodiments, the gradient image segmentation system 102 adds weights to edges that are connecting nodes based on size and color values of the corresponding nodes. In other words, the weight corresponding to the edges is inversely proportionate to how close the color regions are in the color space, thus, the more affinity that two color regions have to be merged, the greater the weight. Additionally, as part of a graph-cut problem, the gradient image segmentation system 102 determines to not cut the node from the graph according to the weights.

For instance, the gradient image segmentation system 102 determines that the first node and the third node are not within the same boundary based on the weight and the connectivity of the graph, which indicates that certain node regions cannot be connected to other node regions based on their other edge connections (e.g., the first node cannot connect to the third node). In other words, a first node is connected to a second node, a second node is connected to a third node, and thus the first node cannot be connected to the third node.

In one or more embodiments, the gradient image segmentation system 102 utilizes a graph-cut model to perform discontinuity aware segmentation. Specifically, as mentioned above, the gradient image segmentation system 102 utilizes the graph-cut model to determine which nodes (e.g., color regions) of the digital image belong to a graph and which nodes belong to a different graph. Based on this determination, the gradient image segmentation system 102 preserves/maintains discontinuities in a digital image and accurately fits fill functions to closed connected partitions.

In one or more embodiments, the gradient image segmentation system 102 utilizes a graph-cut model to generate a plurality of graphs 810 that includes a first graph with a first node and a second node but without a third node (e.g., the third node is not within the same boundary as the first node and the second node). The plurality of graphs 810 also includes a second graph that includes the third node that the gradient image segmentation system 102 cut from the first graph. As mentioned above, the gradient image segmentation system 102 determines to cut nodes off a graph based on the weight between the edges that are connecting the nodes and the connectivity of the nodes. Returning to the example of FIG. 8, the gradient image segmentation system 102 utilizes the graph-cut model to separate the first node, the second node, the third node, and the fourth node (i.e., corresponding to the first region 808*a*, the second region 808*b*, the third region 808*c*, and the fourth region 808*d*) from the fifth node (i.e., corresponding to the fifth region 808*e*) in two separate graphs according to the sizes and colors of the corresponding nodes.

In addition to generating the plurality of graphs 810, the gradient image segmentation system 102 further utilizes the plurality of graphs 810 to update the one or more closed connected partitions of the segmentation map 802. For instance, updating the one or more closed connected partitions assists the gradient image segmentation system 102 to account for discontinuities and to further fit one or more fill functions to the updated one or more closed connected partitions.

FIG. 9 illustrates an example diagram of the gradient image segmentation system 102 performing discontinuity aware segmentation compared with segmentation without discontinuity aware segmentation. For example, FIG. 9 shows an input image 902 with segmentation as described above. Specifically, the gradient image segmentation system 102 utilizes a segmentation model that balances various constraints (e.g., the Mumford-Shaw functional) to generate a segmentation map 904 with locally smooth pixels and closed connected partitions according to a minimal number of boundaries. As shown, the segmentation map 904 shows a first region 904*a* (e.g., filled with a swamp green color) bleeding together with a second region 904*b* (e.g., also a swamp green color), and therefore being part of the same closed connected partition, despite the first region 904*a* and the second region 904*b* not being within the same boundary.

In addition, FIG. 9 also shows the gradient image segmentation system 102 processing the input image 902 with a segmentation model using discontinuity aware segmentation. Specifically, the gradient image segmentation system 102 utilizes the methods described in FIGS. 7-8 to preserve the discontinuities and balance image fidelity with simplified geometry. As shown, the gradient image segmentation system 102 generates a discontinuity aware segmentation map 906 (e.g., where previously, the first region 904*a* and the second region 904*b* bleed together despite a discontinuity 904*c*) and a third region 906*a* and a fourth region 906*b* are identified as separate regions. As such, the gradient image segmentation system uses distinct fill functions for the third region 906*a* and the fourth region 906*b* that are not within the same boundary.

In one or more embodiments, the gradient image segmentation system 102 constructs the weighted undirected graph for performing discontinuity aware segmentation. In some embodiments, the segmentation $S_C$ results in the partition $P:=\{P_1, \ldots, P_n\}$, where each $P_i \in \Pi$ is a region constituted by a set of connected pixels. For instance, for a weighted graph G(P, E, w) where each region of the partition is a vertex, the set of edges is defined as $E:=\{(P,P'):\partial(P) \cap \partial(P') \neq \emptyset\}$.

Moreover, in some embodiments, the weight $w:E \rightarrow \mathbb{R}$ is defined as the reciprocal of the difference of the average color of partitions:

$$w: (P, P') \rightarrow \frac{1}{\|\mu(P) - \mu(P')\|}$$

Furthermore, in some embodiments, the discontinuity in C is captured by the repulsion relation $A \subseteq P \times P$.

In one or more embodiments, for the graph G(P, E, w) and discontinuity map D, the symmetric relation A contains (P, P') if there exist pixels $p \in P$ and $p' \in P$, such that a line segment p, p' intersects D. In one or more embodiments, this problem can be modeled as finding a partition H of P such that, $$\forall (P, P') \in A \text{ iff } \bigvee_{\pi \in \Pi} P \in \pi \rightarrow P' \notin \pi$$

That is, any set $\pi$ of $\Pi$ cannot contain regions which are in the repulsion set A. For example, the constraint admits a trivial solution where each element is a separate set of the partition. The optimization problem is as follows, $$\prod{}^* \rightarrow \underset{\Pi}{\text{argmax}} \sum_{\pi \in \Pi} \left( \sum_{P \in \pi, P' \in \pi} w(P, P') \right)$$

In other words, the gradient image segmentation system 102 finds a partition $\Pi^*$ that honors the constraints of finding a partition $\Pi$ of P and maximizes the sum of all weights in each partition.

The constraint optimization problem is defined by the equations above (e.g., $\forall$(P, P')$\in$ A iff $$\bigvee_{\pi \in \Pi} P \in \pi \rightarrow P' \notin \pi).$$

In one or more embodiments, the corresponding satisfiability problem is obtained in the following rephrasing, where given a graph G and the repulsion set A, does there exist a partition $\Pi$ such that $$\sum_{\pi \in \Pi} \left( \sum_{P \in \pi, P' \in \pi} w(P, P') \right) \geq k$$

For a given constant k.

In one or more embodiments, the satisfiability problem of the above definition is in class NP (e.g., nondeterministic polynomial time). For instance, class NP refers to a computational complexity theory that represents problems for which solutions can be quickly verified (e.g., verified within a reasonable amount of polynomial time).

For instance, it needs to be shown that there exists a non-deterministic Turing machine that can solve the satisfiability problem in polynomial time. Thus, given a partition H, the gradient image segmentation system 102 can calculate the value of, $$\sum_{\pi \in \Pi} \left( \sum_{P \in \pi, P' \in \pi} w(P, P') \right)$$

In linear time, and check whether the value is greater than the given constant k. Next, a lower bound is established by reducing a multi-terminal cut problem (e.g., a generalization of a minimum cut problem for a graph, where the objective is to separate multiple specified terminals with minimal total edge cut weight) to the context of discontinuity aware segmentation for the gradient image segmentation system 102.

In one or more embodiments, the multi-terminal cut problem can be defined as, given a weighted graph G=(V, E, w), and a set S={$s_1$, $s_2$, . . . $s_k$} of k specified vertices or terminals, find a minimum weight set of edges E' $\subseteq$E such that the removal of E' from E disconnects each terminal from all the others. For instance, if k is not fixed, the multi-terminal cut problem for planar graphs I NP-hard (e.g., a class of problems that are at least as difficult as the hardest problems in NP, and finding an efficient solution to these problems remains a significant challenge) even if all edge weights are equal to 1. Furthermore, the multi-terminal cut problem for arbitrary graphs is NP-hard even for fixed k≥3 even if all edge weights are equal to 1.

In one or more embodiments, the constraint optimization problem as defined by the equations above (e.g., $\forall$(P, P')$\in$ A iff $$\left( \underset{\pi \in \Pi}{\forall} P \in \pi \rightarrow P' \notin \pi \right)$$

is NP-hard. For instance, given an instance of multi-terminal cut problem, say (G, S), where G is a weighted graph (V, E, w) and S is a set of terminal nodes, an instance of (G, A) is created using a deterministic polynomial time algorithm such that a solution of the multi-terminal cut problem can be inferred by optimizing the equation shown above $$\left( e.g., \prod{}^* \rightarrow \underset{\Pi}{argmax} \left( \sum_{\pi \in \Pi} \left( \sum_{P \in \pi, P' \in \pi} \right) \right) \right)$$

under the constraints of the other equation shown above (e.g., $\forall$(P, P')$\in$ A iff $$\left( \underset{\pi \in \Pi}{\forall} P \in \pi \rightarrow P' \notin \pi \right)$$

for (G, A). In one or more embodiments, the avoid set A is defined as, $$A = \{(s, s')|s, s' \in S\}$$

A can be created from S by a polynomial (quadratic) time Turing machine. For instance, as a solution to the optimization of $$\prod{}^* \rightarrow \underset{\Pi}{argmax} \sum_{\pi \in \Pi} \left( \sum_{P \in \pi, P' \in \pi} w(P, P') \right)$$

under $\forall$(P, P')$\in$ A iff $$\underset{\pi \in \Pi}{\forall} P \in \pi \rightarrow P' \notin \pi$$

yields a partition Π*. Specifically, the set of minimum cut edges E' of multi-terminal cut problem is represented as, $$E' = E - \bigcup_{\pi \in \Pi^*} E(\pi)$$

Where E(π) is the set of edges where both end nodes are present in π.

In one or more embodiments, the gradient image segmentation system 102 utilizes an approximate polynomial time algorithm to reduce the complexity of the graph-cut problem. Specifically, consider an instance of the partition problem with weight graph G=(V, E, w) and avoid set A. For instance, with the avoid set A of size 1, the partition problem reduces to a min-cut (max flow) problem. Moreover, given a pair of nodes ((p, p')$\in$ A, the gradient image segmentation system 102 progressively creates augmentation graphs by first finding a path p joining p and p', and removing the edge with the smallest edge in the path. In one or more embodiments, for an avoid set A={$a_1$, . . . , $a_k$}, the gradient image segmentation system 102 randomly establishes an order using a heuristic described below. Thus, given an ordered set Â=($a_1$, . . . , $a_k$), the gradient image segmentation system 102 considers each pair in order and progressively creates augmented graphs to build partitions that satisfies the equation $\forall$(P, P')$\in$ A iff $$\underset{\pi \in \Pi}{\forall} P \in \pi \rightarrow P' \notin \pi.$$

Specifically, the gradient image segmentation system 102 executes a min-cut algorithm at most K times, resulting in the parameterized complexity of $O(kn^2)$.

As just mentioned, the gradient image segmentation system 102 uses a heuristic to order the set A, which is the set of pair of nodes of the graph (e.g., (a1, b2), (a2, b2), . . . (an, bn). Every node of the graph represents a region in the digital image with locally smooth pixels (e.g., the same color or similar colors within a threshold). Specifically, the gradient image segmentation system 102 uses a weighted sum of the difference in size (e.g., size of node a–size of node b) and difference in color to establish an order in A.

To illustrate, the gradient image segmentation system 102 uses the following algorithm to perform discontinuity aware segmentation,

| Algorithm Discontinuity Aware Partition |
| --- |
| Require: G = (V, E, w) and Â = ($a_1$, ... , $a_k$). |
| Ensure: A partition Π* that is constrained by the first equation in section (3) |
|    G' ← G Initialize augmented graph |
|    Π ← connected-components (G') Initialize the partition |
|    while A is not empty do |
|       for (s, s') E A do |
|          $\pi \leftarrow arg \underset{\pi \in \prod{}^*}{\exists} \{s, s'\} \subseteq \pi$ |
|          if π exists then |
|             G' ← min-cut (G', s, s') min-cut routine to separate s, s' |

-continued

| Algorithm Discontinuity Aware Partition |
| --- |
| $\Pi \leftarrow$ connected-components (G') recalculate partition<br>Else<br>    $A \leftarrow A - \{(s, s')\}$<br>$\Pi' \leftarrow \Pi$ |

Figure 10:
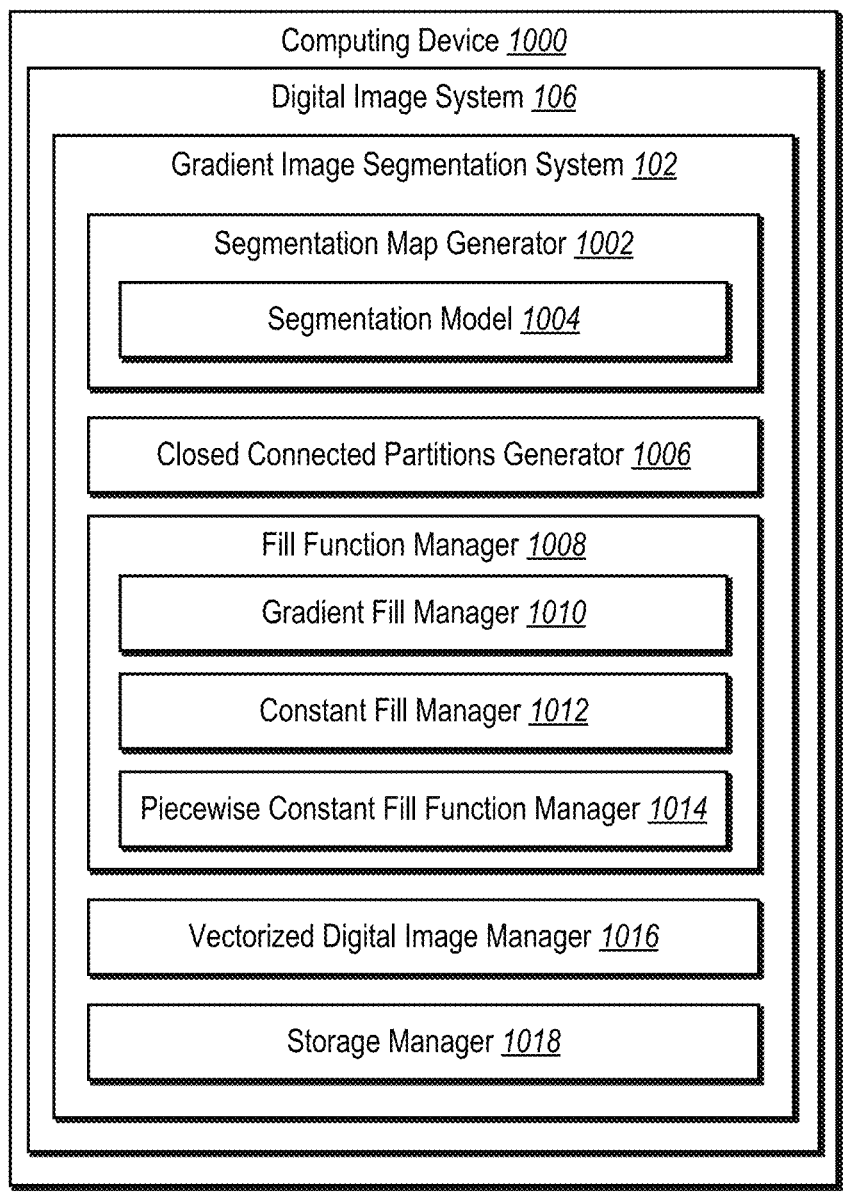
FIG. 10 illustrates a schematic diagram of the gradient image segmentation system in accordance with one or more implementations.

Turning to FIG. 10, additional detail will now be provided regarding various components and capabilities of the gradient image segmentation system 102. In particular, FIG. 10 illustrates an example schematic diagram of a computing device 1000 (e.g., the server(s) 104 and/or the client device 112) implementing the gradient image segmentation system 102 in accordance with one or more embodiments of the present disclosure for components 1000-1018. As illustrated in FIG. 10, the gradient image segmentation system 102 includes an segmentation map generator 1002, a segmentation model 1004, a closed connected partitions generator 1006, a fill function manager 1008, a gradient fill manager 1010 a constant fill manager 1012 a piecewise constant fill function manager 1014, a vectorized digital image manager 1016, and a storage manager 1018.

The segmentation map generator 1002 generates a segmentation map of a raster digital image. For example, the segmentation map generator 1002 utilizes a segmentation model to cluster together pixel values of the raster digital image. For instance, the segmentation map generator 1002 receives an input raster digital image and an indication to vectorize the raster digital image. Based on the indication, the segmentation map generator 1002 also attempts to minimize a number of boundaries within the raster digital image.

The segmentation model 1004 performs various acts of segmenting a raster digital image. For example, the segmentation model 1004 works together with the segmentation map generator to receive one or more requests to vectorize a raster digital image. Furthermore, the segmentation model 1004 classifies/labels each pixel present in the raster digital image. Based on the classification, the segmentation model 1004 creates a segmentation map with various divisions/segments that indicate locally smooth pixel values. In other words, the segmentation model 1004 groups together similar pixel values and minimizes the number of boundaries in a raster digital image.

The closed connected partitions generator 1006 generates one or more closed connected partitions within the segmentation map. Specifically, the closed connected partitions generator 1006 utilizes an edge detector to detect sharp changes (within a threshold amount) of the segmentation map and generates a closed region e.g., partition. Furthermore, the closed connected partitions generator 1006 generates the closed connected partitions where each partition includes locally smooth pixel values that are determined according to the boundaries of the segmentation map.

The fill function manager 1008 fits one or more fill functions to the one or more closed connected partitions. Specifically, the fill function manager 1008 selects from multiple different fill functions to fit to the closed connected partitions. For example, the fill function manager 1008 works together with the gradient fill manager 1010, the constant fill manager 1012 and the piecewise constant fill function manager 1014 to determine the most appropriate fill function to fit to each of the one or more closed connected partitions. Accordingly, the fill function manager 1008 fits at least one gradient fill function to a closed connected partition of the one or more closed connected partitions.

The vectorized digital image manager 1016 generates vectorized images for the digital image according to the gradient fill function for a closed connected partition. Specifically, the vectorized digital image manager 1016 manages the vectorization pipeline in response to receiving the segmentation map with closed connected partitions and fill functions fit to the partitions. For example, the vectorized digital image manager 1016 performs tasks such as curve tracing and converting various elements of the digital image into vector elements (e.g., Bezier curves) according to the segmentation map. Accordingly, the vectorized digital image manager 1016 generates the vectorized version of the digital image and provides the vector image to a digital image application.

The storage manager 1018 stores various components discussed in FIG. 10. For example, the storage manager 1018 stores the segmentation model, the edge detector, the raster digital images, the utilized fill functions, the closed connected partitions, the vectorized digital images, and graphs generated from discontinuity aware segmentation (e.g., the graphs discussed above in FIGS. 7-9). Additionally, the storage manager 1018 also stores training components such as a training dataset and the generated image pairs used to train a segmentation model.

Each of the components 1002-1018 of the gradient image segmentation system 102 include software, hardware, or both. For example, the components 1002-1018 include one or more instructions stored on a computer-readable storage medium and executable by processors of one or more computing devices, such as a client device or server device. When executed by the one or more processors, the computer-executable instructions of the gradient image segmentation system 102 cause the computing device(s) to perform the methods described herein. Alternatively, the components 1002-1018 include hardware, such as a special-purpose processing device to perform a certain function or group of functions. Alternatively, the components 1002-1018 of the gradient image segmentation system 102 include a combination of computer-executable instructions and hardware.

Furthermore, the components 1002-1018 of the gradient image segmentation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1018 of the gradient image segmentation system 102 may be implemented as a stand-alone application, such as a desktop or mobile application. Furthermore, the components 1002-1018 of the gradient image segmentation system 102 may be implemented as one or more web-based applications hosted on a remote server. Alternatively, or additionally, the components 1002-1018 of the gradient image segmentation system 102 may be implemented in a suite of mobile device applications or "apps." For example, in one or more embodiments, the gradient image segmentation system 102 comprise or operate in connection with digital software applications such as ADOBE® ILLUSTRATOR® and ADOBE® FIREFLY.

FIGS. 1-10, the corresponding text, and the examples provide a number of different methods, systems, devices, and non-transitory computer-readable media of the 1002-1018. In addition to the foregoing, one or more embodiments are described in terms of flowcharts comprising acts for accomplishing the particular result, as shown in FIG. 11.

FIG. 11 may be performed with more or fewer acts. Further, the acts may be performed in different orders. Additionally, the acts described herein may be repeated or performed in parallel with one another or in parallel with different instances of the same or similar acts.

FIG. 11 illustrates a flowchart of a series of acts 1100 for generating a vectorized digital image in accordance with one or more embodiments. FIG. 11 illustrates acts according to one embodiment, alternative embodiments may omit, add to, reorder, and/or modify any of the acts shown in FIG. 11. In some implementations, the acts of FIG. 11 are performed as part of a method. For example, in some embodiments, the acts of FIG. 11 are performed as part of a computer-implemented method. Alternatively, a non-transitory computer-readable medium stores instructions thereon that, when executed by at least one processor, cause a computing device to perform the acts of FIG. 11. In some embodiments, a system performs the acts of FIG. 11. For example, in one or more embodiments, a system includes at least one memory device. The system further includes at least one server device configured to cause the system to perform the acts of FIG. 11.

The series of acts 1100 includes an act 1102 of generating a segmentation map of a raster digital image by utilizing a segmentation model. Moreover, the act 1102 includes a sub-act 1102a of utilizing a segmentation model to cluster pixel values of the raster digital image while minimizing a number of boundaries. Further, the series of acts 1100 includes an act 1104 of generating one or more closed connected partitions comprising locally smooth pixel values within the raster image. Moreover, the series of acts 1100 includes an act 1106 of fitting one or more fill functions to the one or more closed connected partitions. Further, the act 1106 includes a sub-act 1106a of fitting a fill function that includes at least one gradient fill function. Moreover, the series of acts 1100 includes an act 1108 of generating a vectorized digital image according to the one or more fill functions.

In particular, the act 1102 generating, by at least one processor, a segmentation map of a raster digital image by utilizing a segmentation model to cluster pixel values of the raster digital image while minimizing a number of boundaries within the raster digital image. Further, the act 1104 includes generating, by the at least one processor, one or more closed connected partitions comprising locally smooth pixel values within the raster digital image according to boundaries of the segmentation map. Moreover, the act 1106 includes fitting, by the at least one processor, one or more fill functions to the one or more closed connected partitions, the one or more fill functions comprising at least one gradient fill function for a closed connected partition of the one or more closed connected partitions. Further, the act 1108 includes generating, by the at least one processor, a vectorized digital image according to the at least one gradient fill function for the closed connected partition.

For example, in one or more embodiments, the series of acts 1100 includes utilizing the segmentation model to minimize the number of boundaries by determining a first constraint on a reconstruction loss relative to the raster digital image indicating a level of similarity of the raster digital image with the segmentation map. In addition, in one or more embodiments, the series of acts 1100 includes determining a second constraint on local constancy in pixel values indicating a local level of smoothness of the raster digital image. Further, in one or more embodiments, the series of acts 1100 includes determining a third constraint on numbers of pixels at edges of boundaries. Further, in some embodiments, the series of acts 1100 includes balancing the first constraint, the second constraint, and the third constraint to maximize a number of pixels grouped together with a minimal number of boundaries.

Moreover, in one or more embodiments, the series of acts 1100 includes generating the one or more closed connected partitions comprises generating a first closed connected partition of the one or more closed connected partitions in response to balancing the first constraint, the second constraint, and the third constraint. Further, in one or more embodiments, the series of acts 1100 includes fitting the one or more fill functions to the one or more closed connected partitions comprises fitting a gradient fill function to the first closed connected partition of the one or more closed connected partitions. Moreover, in one or more embodiments, the series of acts 1100 includes generating the one or more closed connected partitions comprises generating a second closed connected partition of the one or more closed connected partitions in response to balancing the first constraint, the second constraint, and the third constraint. Further, in one or more embodiments, the series of acts 1100 includes fitting the one or more fill functions to the one or more closed connected partitions comprises fitting a constant fill function to the second closed connected partition of the one or more closed connected partitions.

Moreover, in one or more embodiments, the series of acts 1100 includes fitting the at least one gradient fill function to the closed connected partition by determining a direction of the at least one gradient fill function within the closed connected partition. Additionally, in one or more embodiments, the series of acts 1100 includes determining one or more stops for the at least one gradient fill function indicating one or more color transitions.

Moreover, in one or more embodiments, series of acts 1100 includes assigning a weight to the first edge between the first node and the second node based on an inverse proportional relationship of a distance between the first node and the second node in a color space. For example, in one or more embodiments, the series of acts 1100 includes generating a second edge between the second node and a third node. In addition, in one or more embodiments, the series of acts 1100 includes determining that the first node and the third node are not within the same boundary. Further, in one or more embodiments, the series of acts 1100 includes generating, utilizing a graph-cut model, a graph that comprises the first node and the second node without the third node. Further, in some embodiments, the series of acts 1100 includes updating the one or more closed connected partitions according to the graph comprising the first node and the second node and an additional graph comprising the third node. Moreover, in some embodiments, the series of acts 1100 includes fitting the one or more fill functions to the updated one or more closed connected partitions.

Furthermore, in one or more embodiments, the series of acts 1100 includes in response to a vectorization request, generating a segmentation map of a raster digital image by utilizing a segmentation model to cluster pixel values of the raster digital image while minimizing a number of boundaries within the raster digital image. Moreover, in one or more embodiments, the series of acts 1100 includes generating one or more closed connected partitions comprising locally smooth pixel values within the raster digital image according to boundaries of the segmentation map. Moreover, in one or more embodiments, the series of acts 1100 includes fitting one or more fill functions to the one or more closed connected partitions, the one or more fill functions comprising at least one gradient fill function for a closed connected partition of the one or more closed connected partitions. Further, in one or more embodiments, the series of acts 1100 includes determine a direction and one or more stops of the at least one gradient fill function, the one or more stops indicating one or more transitions within the at least one gradient fill function. In one or more embodiments, the series of acts 1100 includes generating a vectorized digital image according to the at least one gradient fill function for the closed connected partition according to the direction and the one or more stops of the at least one gradient fill function.

Moreover, in one or more embodiments, the series of acts 1100 includes generating the segmentation map of a raster digital image by utilizing the segmentation model to balance the number of boundaries with constraints on a reconstruction loss relative to the raster digital image with local constancy in pixel values, and numbers of pixels at edges of boundaries. Further, in one or more embodiments, the series of acts 1100 includes selecting from a constant fill function, a piecewise constant fill function, and a gradient fill function to fill the one or more closed connected partitions.

Moreover, in some embodiments, the series of acts 1100 includes fitting the constant fill function for a first closed connected partition of the one or more closed connected partitions. Further, in some embodiments, the series of acts 1100 includes fitting the gradient fill function for a second closed connected partition of the one or more closed connected partitions. Moreover, in some embodiments, the series of acts 1100 includes fitting the piecewise constant fill function for a third closed connected partition of the one or more closed connected partitions.

Furthermore, in one or more embodiments, the series of acts 1100 includes determining a direction of a first gradient fill function within a first closed connected partition based on the direction aligning a threshold number of pixels in the first closed connected partition. Moreover, in one or more embodiments, the series of acts 1100 includes determining one or more stops along the first gradient fill function based on a threshold change in a rate of change of the direction.

For example, in one or more embodiments, the series of acts 1100 includes generating, utilizing a graph-cut model, a first graph representing a subset of the one or more closed connected partitions and a second graph representing an additional subset of the one or more closed connected partitions. In addition, in one or more embodiments, the series of acts 1100 includes wherein the subset of the one or more closed connected partitions of the first graph do not share a same boundary as the additional subset of the one or more closed connected partitions of the second graph. Further, in one or more embodiments, the series of acts 1100 includes updating one or more closed connected partitions according to the first graph and the second graph. Further, in some embodiments, the series of acts 1100 includes fit the one or more fill functions to the updated one or more closed connected partitions.

Furthermore, in one or more embodiments, the series of acts 1100 includes generating a segmentation map of a raster digital image by utilizing a segmentation model to cluster pixel values of the raster digital image while minimizing a number of boundaries within the raster digital image. Moreover, in one or more embodiments, the series of acts 1100 includes generating one or more closed connected partitions comprising locally smooth pixel values within the raster digital image according to boundaries of the segmentation map. Further, in one or more embodiments, the series of acts 1100 includes selecting from a constant fill function, a piecewise constant fill function, and a gradient fill function to fill the one or more closed connected partitions. Further, in some embodiments, the series of acts 1100 includes fitting at least one gradient fill function for a closed connected partition of the one or more closed connected partitions. Furthermore, in one or more embodiments, the series of acts 1100 includes generating a vectorized digital image according to the at least one gradient fill function for the closed connected partition.

Furthermore, in one or more embodiments, the series of acts 1100 includes balancing a first constraint on a reconstruction loss relative to the raster digital image, a second constraint on a local constancy in pixel values, and a third constraint on a number of pixels at edges of boundaries to maximize a number of pixels grouped together with a minimal number of boundaries. Moreover, in one or more embodiments, the series of acts 1100 includes fitting the constant fill function for a first additional closed connected partition of the one or more closed connected partitions. In one or more embodiments, the series of acts 1100 includes fitting the gradient fill function for a second additional closed connected partition of the one or more closed connected partitions, the gradient fill function comprising a radial gradient fill function.

Further, in one or more embodiments, the series of acts 1100 includes determining a direction of the at least one gradient fill function for the closed connected partition of the one or more closed connected partitions. Moreover, in one or more embodiments, the series of acts 1100 includes determining one or more stops along the at least one gradient fill function, wherein the one or more stops indicate one or more color transitions within the at least one gradient fill function. Further, in one or more embodiments, the series of acts 1100 includes generating, utilizing a graph-cut model, a first graph representing a subset of the one or more closed connected partitions and a second graph representing an additional subset of the one or more closed connected partitions. Moreover, in one or more embodiments, the series of acts 1100 includes updating the one or more closed connected partitions according to the first graph and the second graph. Further, in one or more embodiments, the series of acts 1100 includes fitting one or more fill functions to the updated one or more closed connected partitions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
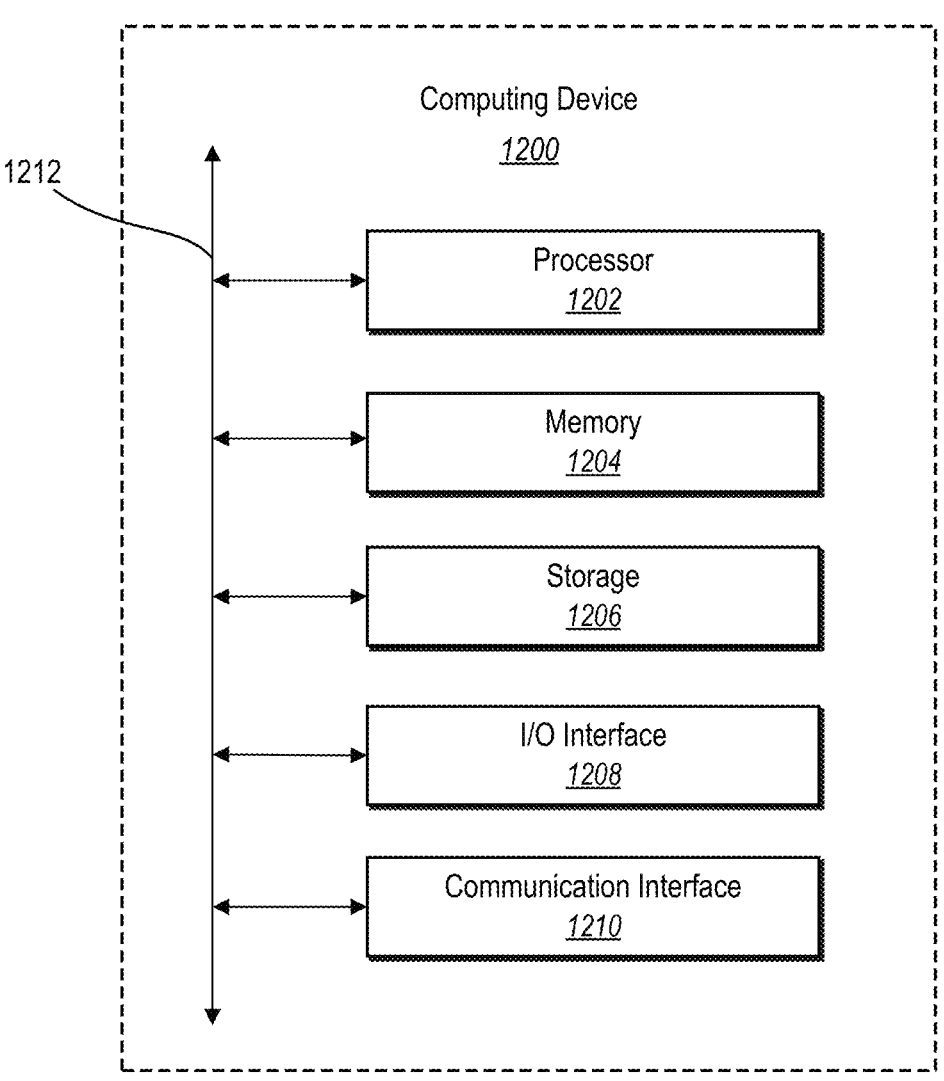
FIG. 12 illustrates a block diagram of an exemplary computing device in accordance with one or more implementations.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 104 and/or the client device 112). In one or more embodiments, the computing device 1200 may be a mobile device (e.g., a mobile telephone, a smartphone, a PDA, a tablet, a laptop, a camera, a tracker, a watch, a wearable device). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 include hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 including storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed:

1. A computer-implemented method comprising:
   generating, by at least one processor, a segmentation map of a raster digital image by utilizing a segmentation model to cluster pixel values of the raster digital image while minimizing a number of boundaries within the raster digital image;
   generating, by the at least one processor, one or more closed connected partitions comprising locally smooth pixel values within the raster digital image according to boundaries of the segmentation map;
   fitting, by the at least one processor, one or more fill functions to the one or more closed connected partitions, the one or more fill functions comprising at least one gradient fill function for a closed connected partition of the one or more closed connected partitions; and
   generating, by the at least one processor, a vectorized digital image according to the at least one gradient fill function for the closed connected partition.

2. The computer-implemented method of claim 1, wherein generating the segmentation map of the raster digital image by utilizing the segmentation model to minimize the number of boundaries by:
   determining a first constraint on a reconstruction loss relative to the raster digital image indicating a level of similarity of the raster digital image with the segmentation map;
   determining a second constraint on local constancy in pixel values indicating a local level of smoothness of the raster digital image; and
   determining a third constraint on numbers of pixels at edges of boundaries.

3. The computer-implemented method of claim 2, wherein utilizing the segmentation model to minimize the number of boundaries comprises balancing the first constraint, the second constraint, and the third constraint to maximize a number of pixels grouped together with a minimal number of boundaries.

4. The computer-implemented method of claim 2, wherein:
   generating the one or more closed connected partitions comprises generating a first closed connected partition of the one or more closed connected partitions in response to balancing the first constraint, the second constraint, and the third constraint; and
   fitting the one or more fill functions to the one or more closed connected partitions comprises fitting a gradient fill function to the first closed connected partition of the one or more closed connected partitions.

5. The computer-implemented method of claim 2, wherein:
   generating the one or more closed connected partitions comprises generating a second closed connected partition of the one or more closed connected partitions in response to balancing the first constraint, the second constraint, and fitting the one or more fill functions to the one or more closed connected partitions comprises fitting a constant fill function to the second closed connected partition of the one or more closed connected partitions.

6. The computer-implemented method of claim 1, wherein fitting the one or more fill functions to the one or more closed connected partitions comprises fitting the at least one gradient fill function to the closed connected partition by:

determining a direction of the at least one gradient fill function within the closed connected partition; and determining one or more stops for the at least one gradient fill function indicating one or more color transitions.

7. The computer-implemented method of claim 1, further comprising:

generating a plurality of nodes representing a plurality of closed connected partitions of the one or more closed connected partitions utilizing color-based segmentation;

determining an order for the plurality of nodes based on weighted sums of differences in sizes and colors of the plurality of nodes; and generating, according to the order of the plurality of nodes, a first edge between a first node and a second node of the plurality of nodes in response to determining that the first node and the second node are within a same boundary.

8. The computer-implemented method of claim 7, further comprising:

assigning a weight to the first edge between the first node and the second node based on an inverse proportional relationship of a distance between the first node and the second node in a color space;

generating a second edge between the second node and a third node;

determining that the first node and the third node are not within the same boundary; and generating, utilizing a graph-cut model, a graph that comprises the first node and the second node without the third node.

9. The computer-implemented method of claim 8, further comprising:

updating the one or more closed connected partitions according to the graph comprising the first node and the second node and an additional graph comprising the third node; and fitting the one or more fill functions to the updated one or more closed connected partitions.

10. A system comprising:

one or more memory devices; and one or more processors configured to cause the system to:

in response to a vectorization request, generate a segmentation map of a raster digital image by utilizing a segmentation model to cluster pixel values of the raster digital image while minimizing a number of boundaries within the raster digital image;

generate one or more closed connected partitions comprising locally smooth pixel values within the raster digital image according to boundaries of the segmentation map;

fit one or more fill functions to the one or more closed connected partitions, the one or more fill functions comprising at least one gradient fill function for a closed connected partition of the one or more closed connected partitions;

determine a direction and one or more stops of the at least one gradient fill function, the one or more stops indicating one or more transitions within the at least one gradient fill function; and generate a vectorized digital image according to the at least one gradient fill function for the closed connected partition according to the direction and the one or more stops of the at least one gradient fill function.

11. The system of claim 10, wherein the one or more processors are configured to cause the system to generate the segmentation map of a raster digital image by utilizing the segmentation model to balance the number of boundaries with constraints on a reconstruction loss relative to the raster digital image with local constancy in pixel values, and numbers of pixels at edges of boundaries.

12. The system of claim 11, wherein the one or more processors are configured to cause the system to select from a constant fill function, a piecewise constant fill function, and a gradient fill function to fill the one or more closed connected partitions.

13. The system of claim 12, wherein the one or more processors are configured to cause the system to:

fit the constant fill function for a first closed connected partition of the one or more closed connected partitions;

fit the gradient fill function for a second closed connected partition of the one or more closed connected partitions; and fit the piecewise constant fill function for a third closed connected partition of the one or more closed connected partitions.

14. The system of claim 10, wherein the one or more processors are configured to cause the system to fit a gradient fill function to a first closed connected partition of the one or more closed connected partitions by:

determining a direction of a first gradient fill function within a first closed connected partition based on the direction aligning a threshold number of pixels in the first closed connected partition; and determining one or more stops along the first gradient fill function based on a threshold change in a rate of change of the direction.

15. The system of claim 10, wherein the one or more processors are configured to cause the system to:

generate, utilizing a graph-cut model, a first graph representing a subset of the one or more closed connected partitions and a second graph representing an additional subset of the one or more closed connected partitions, wherein the subset of the one or more closed connected partitions of the first graph do not share a same boundary as the additional subset of the one or more closed connected partitions of the second graph;

update one or more closed connected partitions according to the first graph and the second graph; and fit the one or more fill functions to the updated one or more closed connected partitions.

16. A non-transitory computer-readable medium storing executable instructions which, when executed by at least one processing device, cause the at least one processing device to perform operations comprising:

generating a segmentation map of a raster digital image by utilizing a segmentation model to cluster pixel values of the raster digital image while minimizing a number of boundaries within the raster digital image;

generating one or more closed connected partitions comprising locally smooth pixel values within the raster digital image according to boundaries of the segmentation map;

selecting from a constant fill function, a piecewise constant fill function, and a gradient fill function to fill the one or more closed connected partitions;

fitting at least one gradient fill function for a closed connected partition of the one or more closed connected partitions; and generating a vectorized digital image according to the at least one gradient fill function for the closed connected partition.

17. The non-transitory computer-readable medium of claim 16, wherein generating the segmentation map further comprises balancing a first constraint on a reconstruction loss relative to the raster digital image, a second constraint on a local constancy in pixel values, and a third constraint on a number of pixels at edges of boundaries to maximize a number of pixels grouped together with a minimal number of boundaries.

18. The non-transitory computer-readable medium of claim 16, wherein the operations further comprise:

fitting the constant fill function for a first additional closed connected partition of the one or more closed connected partitions; and fitting the gradient fill function for a second additional closed connected partition of the one or more closed connected partitions, the gradient fill function comprising a radial gradient fill function.

19. The non-transitory computer-readable medium of claim 16, wherein fitting the at least one gradient fill function comprises:

determining a direction of the at least one gradient fill function for the closed connected partition of the one or more closed connected partitions; and determining one or more stops along the at least one gradient fill function, wherein the one or more stops indicate one or more color transitions within the at least one gradient fill function.

20. The non-transitory computer-readable medium of claim 16, wherein the operations further comprise:

generating, utilizing a graph-cut model, a first graph representing a subset of the one or more closed connected partitions and a second graph representing an additional subset of the one or more closed connected partitions, updating the one or more closed connected partitions according to the first graph and the second graph; and fitting one or more fill functions to the updated one or more closed connected partitions.

* * * * *